(12) United States Patent
Jinnu et al.

(10) Patent No.: US 9,942,805 B2
(45) Date of Patent: Apr. 10, 2018

(54) UE HANDLING OF STALE OR INCOMPLETE PDUS AFTER CELL RESELECTION OR RECONFIGURATION

(71) Applicant: QUALCOMM Incorporated, San Diego, CA (US)

(72) Inventors: Adarsh Kumar Jinnu, Hyderabad (IN); Ansah Ahmed Sheik, Eluru (IN); Vagish Gupta, Hyderabad (IN); Sitaramanjaneyulu Kanamarlapudi, San Diego, CA (US); Chetan Gopalakrishnan Chakravarthy, San Diego, CA (US); Arvindhan Kumar, San Diego, CA (US); Yongsheng Shi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 226 days.

(21) Appl. No.: 14/823,887

(22) Filed: Aug. 11, 2015

(65) Prior Publication Data
US 2016/0135097 A1 May 12, 2016

Related U.S. Application Data

(60) Provisional application No. 62/078,841, filed on Nov. 12, 2014.

(51) Int. Cl.
*H04W 36/00* (2009.01)
*H04W 76/02* (2009.01)
(Continued)

(52) U.S. Cl.
CPC ....... *H04W 36/0055* (2013.01); *H04W 24/10* (2013.01); *H04W 76/028* (2013.01); *H04W 76/046* (2013.01); *H04W 88/02* (2013.01)

(58) Field of Classification Search
None
See application file for complete search history.

(56) References Cited

U.S. PATENT DOCUMENTS

2005/0175034 A1* 8/2005 De Jong ............. H04W 76/027
370/473
2008/0170522 A1* 7/2008 Sammour ............. H04L 1/1877
370/310
(Continued)

FOREIGN PATENT DOCUMENTS

GB          2 491 277 A      11/2012
WO     WO-2009/076124 A1    6/2009

OTHER PUBLICATIONS

International Search Report and Written Opinion—PCT/US2015/056781—ISA/EPO—dated Feb. 24, 2016. (13 total pages).

*Primary Examiner* — Nicholas Sloms
(74) *Attorney, Agent, or Firm* — Arent Fox, LLP

(57) ABSTRACT

The disclosure provides for a UE handling messages in wireless communication. The disclosure provides for a UE partially exchanging a first signaling-related message associated with a first UE configuration with a network entity and triggering a state transition message that initiates a change to a second UE configuration different from the first UE configuration. In an aspect, the UE determines that the first message has not been successfully received or successfully transmitted. In an aspect, the UE sends an indication message to coordinate discarding of the first message with the network entity and receives, after sending the indication message, a second signaling-related message associated with the second UE configuration. In another aspect, the UE, after partially sending a signaling-related message, receives a reconfiguration request associated with a second UE
(Continued)

configuration. In an aspect, the UE determines that the message has not been successfully transmitted and causes a reconfiguration failure.

26 Claims, 12 Drawing Sheets

(51) Int. Cl.
*H04W 24/10* (2009.01)
*H04W 76/04* (2009.01)
*H04W 88/02* (2009.01)

(56) References Cited

U.S. PATENT DOCUMENTS

| | | |
|---|---|---|
| 2013/0034076 A1 | 2/2013 | Ketchum et al. |
| 2013/0235844 A1 | 9/2013 | Ge et al. |
| 2013/0315260 A1 | 11/2013 | Adiraju et al. |
| 2014/0051454 A1* | 2/2014 | Wirtanen ............ H04W 76/046 455/452.1 |
| 2014/0274083 A1 | 9/2014 | Sheik et al. |

* cited by examiner

UE HANDLING OF STALE OR INCOMPLETE PDUS AFTER CELL RESELECTION OR RECONFIGURATION

CROSS-REFERENCE TO RELATED APPLICATIONS

This application claims the benefit of U.S. Provisional Application Ser. No. 62/078,841, entitled, "Apparatus and Method of Optimizing UE Behavior to Handle Stale/Incomplete PDUs After Cell Reselection or Reconfiguration" and filed on Nov. 12, 2014, which is expressly incorporated by reference herein in its entirety.

BACKGROUND

Aspects of the present disclosure relate generally to wireless communication systems, and more particularly, to handling stale or incomplete packet data units (PDUs or packets) in a wireless network.

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

One problem may occur, for example, in UMTS networks, when a user equipment (UE) in Forward Access Channel (Cell_FACH) or Paging Channel (Cell_PCH) states, for example, moves from one cell to another cell, which causes the UE to trigger a Cell Update procedure in the new cell. For example, as discussed in 3GPP Specification 25.331 (herein incorporated by reference), the cell update procedure (discussed, for example, in section 8.3.1) can be done periodically or can be triggered. The cell update can be triggered, for example, when a UE selects a new cell (e.g., cell reselection), responds to a paging message, fails to transmit a message or receive an acknowledged (e.g., radio link failure), and/or re-enters the service area. In some instances, the UE may have an active signaling connection where parts of a sequence (e.g., a service data unit) are sent between the UE and a network entity using multiple protocol data units (PDUs). When a cell update procedure between the UE and the network occurs before the messages at the UE or network side is sent, UE configuration information associated with the unsent messages does not match the updated UE configuration information associated with the cell update procedure. Subsequent use of stale information (e.g., based on non-current UE configuration information) included in the previously-received PDUs may cause connection problems between the UE and network (e.g., time outs, call drops, call delays, etc).

Therefore, improvements in handling of PDUs in during wireless communication are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method of handling messages in wireless communication is provided. In an aspect, the method includes a receiver or transmitter of a user equipment (UE) partially receiving or transmitting via a signaling radio bearer a first signaling-related message associated with a first UE configuration from or to a network entity. In an aspect, the method also includes triggering a state transition message that initiates a change at the UE to a second UE configuration different from the first UE configuration. In an aspect, the method also includes determining, in association with the triggering of the state transition message, that the first signaling-related message has not been successfully received or successfully transmitted. In an aspect, the method also includes the UE sending, after determining that the first signaling-related message has not been successfully received or successfully transmitted, an indication message to coordinate discarding of the first signaling-related message with the network entity. In an aspect, the method also includes the UE receiving, after sending the indication message, a second signaling-related message associated with the second UE configuration.

In another aspect, a method of wireless communication of a multi-segment message is provided. In an aspect, the method includes a UE partially sending via a signaling radio bearer a signaling-related message associated with a first UE configuration. In an aspect, the method also includes the UE receiving a reconfiguration request associated with a second UE configuration different from the first UE configuration. The method also includes the UE determining that the signaling-related message has not been successfully received or successfully transmitted. In an aspect, the method also includes causing a reconfiguration failure in response to the receiving of the reconfiguration message and the determining that the signaling-related message has not been successfully received or successfully transmitted.

In an aspect, an apparatus for handling messages in wireless communication is provided. In an aspect, the apparatus at least one processor, a receiver configured to receive messages, a transmitter configured to send messages, a memory, and a bus coupled to the at least one processor, receiver, transmitter, and memory. In an aspect, the at least one processor is configured to partially receive or transmit via a signaling radio bearer a first signaling-related message associated with a first UE configuration from or to a network entity. In an aspect, the at least one processor is also configured to trigger a state transition message that initiates a change at the UE to a second UE configuration different from the first UE configuration. In an aspect, the at least one processor is further configured to determine, in association with the triggering of the state transition message, that the first signaling-related message has not been successfully received or successfully transmitted. In an aspect, the at least one processor is further configured to send, after determining that the first signaling-related message has not been successfully received or successfully transmitted, an indication message to coordinate discarding of the first signaling-related message with the network entity. In an aspect, the at least one processor if further configured to receive, after sending the indication message, a second signaling-related message associated with the second UE configuration.

In another aspect, an apparatus of wireless communication of a multi-segment message is provided. In an aspect, the apparatus includes at least one processor, a receiver configured to receive messages, a transmitter configured to send messages, a memory, and a bus coupled to the at least one processor, receiver, transmitter, and memory. In an aspect, the at least one processor is configured to partially send via a signaling radio bearer a signaling-related message associated with a first UE configuration. In an aspect, the at least one processor is further configured to receive a reconfiguration request associated with a second UE configuration different from the first UE configuration. The at least one processor is further configured to determine that the signaling-related message has not been successfully received or successfully transmitted. In an aspect, the at least one processor is further configured to cause a reconfiguration failure in response to the receiving of the reconfiguration message and the determining that the signaling-related message has not been successfully received or successfully transmitted.

In an aspect, an apparatus of handling messages in wireless communication is provided. In an aspect, the apparatus includes means for partially receiving or transmitting via a signaling radio bearer a first signaling-related message associated with a first UE configuration from or to a network entity. In an aspect, the apparatus also includes means for triggering a state transition message that initiates a change at the UE to a second UE configuration different from the first UE configuration. In an aspect, the apparatus also includes means for determining, in association with the triggering of the state transition message, that the first signaling-related message has not been successfully received or successfully transmitted. In an aspect, the apparatus also includes means for sending, after determining that the first signaling-related message has not been successfully received or successfully transmitted, an indication message to coordinate discarding of the first signaling-related message with the network entity. In an aspect, the apparatus also includes means for receiving, after sending the indication message, a second signaling-related message associated with the second UE configuration.

In another aspect, an apparatus of wireless communication of a multi-segment message is provided. In an aspect, the apparatus includes means for partially sending via a signaling radio bearer a signaling-related message associated with a first UE configuration. In an aspect, the apparatus also includes means for receiving a reconfiguration request associated with a second UE configuration different from the first UE configuration. The apparatus also includes means for determining that the signaling-related message has not been successfully received or successfully transmitted. In an aspect, the apparatus also includes means for causing a reconfiguration failure in response to the receiving of the reconfiguration message and the determining that the signaling-related message has not been successfully received or successfully transmitted.

In an aspect, a computer-readable medium executable on at least one processor for handling messages in wireless communication is provided. In an aspect, the computer-readable medium includes code for partially receiving or transmitting via a signaling radio bearer a first signaling-related message associated with a first UE configuration from or to a network entity. In an aspect, the computer-readable medium also includes means for triggering a state transition message that initiates a change at the UE to a second UE configuration different from the first UE configuration. In an aspect, the computer-readable medium also includes code for determining, in association with the triggering of the state transition message, that the first signaling-related message has not been successfully received or successfully transmitted. In an aspect, the computer-readable medium also includes code for sending, after determining that the first signaling-related message has not been successfully received or successfully transmitted, an indication message to coordinate discarding of the first signaling-related message with the network entity. In an aspect, the computer-readable medium also includes code for receiving, after sending the indication message, a second signaling-related message associated with the second UE configuration.

In another aspect, a computer-readable medium executable on at least one processor for wireless communication of a multi-segment message is provided. In an aspect, the computer-readable medium includes code for partially sending via a signaling radio bearer a signaling-related message associated with a first UE configuration. In an aspect, the computer-readable medium also includes code for receiving a reconfiguration request associated with a second UE configuration different from the first UE configuration. The computer-readable medium also includes code for determining that the signaling-related message has not been successfully received or successfully transmitted. In an aspect, the computer-readable medium also includes code for causing a reconfiguration failure in response to the receiving of the reconfiguration message and the determining that the signaling-related message has not been successfully received or successfully transmitted.

These and other aspects of the disclosure will become more fully understood upon a review of the detailed description, which follows.

BRIEF DESCRIPTION OF THE DRAWINGS

The accompanying drawings are presented to aid in the description of various aspects of the disclosure and are provided solely for illustration of the aspects and not limitation thereof. The drawings include like reference numbers for like elements, and may represent optional components or actions using dashed lines.

DETAILED DESCRIPTION

Figure 1:
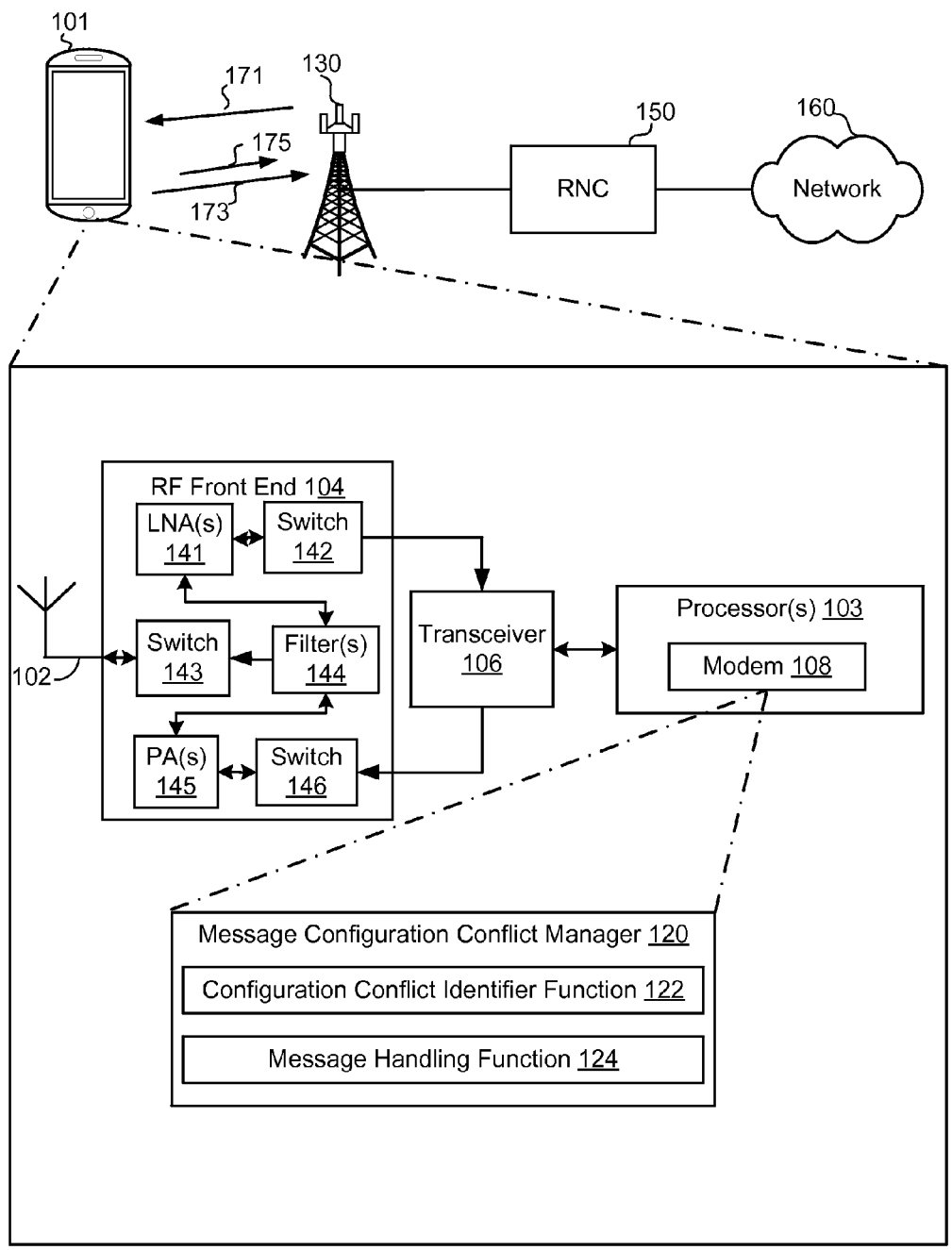
FIG. 1 is a block diagram illustrating an example communications network including a network entity, such as a base station, in communication with a user equipment (UE) configured for management of packet segments sent between the UE and the network entity.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. Also, the term "manager" or "function" as used herein may be one of the parts that make up a system, may be hardware, firmware, and/or software, and may be divided into other functions.

The present disclosure provides for enhanced handling of protocol data units (PDUs) between a UE and a network based on UE configuration information associated with a cell update and/or reconfiguration request. While a UE is either sending or receiving a first signaling message, an event may occur to trigger the UE to transition from its current UE configuration to a new UE configuration. Any non-fully successfully sent or received messages, e.g., partially-transmitted or non-acknowledged messages, between the network and the UE may become stale (e.g., out-of-sync) and the UE may trigger itself and the network to discard the stale segments and/or messages. In particular, the present disclosure relates to how to manage situations in which one message associated with one UE configuration is pending, e.g., because a message is either only partially-transmitted or not acknowledged, and another message associated with a different UE configuration is received.

The UE may, for example, receive different messages at separate times, e.g., first and second signaling messages that contain conflicting UE configurations. For example, in one aspect, the first signaling message, may, for example, be segmented into multiple message segments, and the first signaling message may be a first reconfiguration message sent by a network entity (e.g., a base station) to the UE. A second signaling message may be a second reconfiguration message that, in an aspect, is completely received at the UE while at least one segment of the first reconfiguration message is still pending receipt. In another example, the first signaling message, which may be segmented into multiple messages, may be an initial direct transfer (IDT) message sent by the UE to a network entity, while the second signaling message may be a reconfiguration message completely received at the UE from the network entity while at least one segment of the IDT message is pending transmission. The present disclosure provides solutions for handling such conflicts between UE configuration information associated with the different signaling messages such that the UE and network remain in communication using a synchronized UE configuration.

In another example, in one aspect, a UE may send, as the first signaling message, a measurement report to the network that includes an indication to replace a cell in an active set of the UE. In an aspect, the UE may determine a radio link failure. In an aspect, the UE may determine that the measurement report has not been received based on a lack of receiving an acknowledgement message ("ACK") for the transmitted measurement report. In an aspect, the UE may send a cell update message in response to the determined radio link failure and based on the cell update procedure, may trigger the network entity and/or the UE to discard the initially-sent measurement report. In an aspect, the UE may then configure the UE according to the second UE configuration in the cell update message.

Further, in another specific example, in a network with a UE in a cell, a portion of a first signaling message comprising a multi-segment signaling message associated with a first UE state and first UE configuration is received at the UE from a network entity. In an aspect, an event may trigger an update to the UE configuration, e.g., a second UE configuration, of the UE in relation to the network. For example, the UE may perform a cell reselection procedure, determine a radio link failure, receive a periodic cell update notification, or re-enter service area of a cell, then a cell update procedure. As a result, the UE may receive updated UE configuration information, e.g., the second UE configuration, including, for example, updated identification information (such as, but not limited to, one or more of a Cell Radio Network Temporary Identifier (C-RNTI), an HS-DSCH Radio Network Temporary Identifier (H-RNTI), and an E-DCH Radio Network Temporary Identifier (E-RNTI)). The updated UE configuration information may be received in a second signaling message, such as a reconfiguration message. As noted above, in one aspect, the UE may receive the reconfiguration message with the updated UE configuration information while an earlier reconfiguration message, e.g., the remaining portion of the multi-segment signaling message associated with the first UE state and first UE configuration, is still pending.

In an aspect, the UE may determine that the second signaling message associated with the updated UE state and updated UE configuration information is received while an unsent message segment associated with the first UE configuration is still pending. As such, the UE may take actions to ensure that the UE and network communicate using a synchronized UE configuration. For example, upon receipt of a second reconfiguration message with updated UE configuration information, in response to determining that a first reconfiguration message segment is still pending, the UE may send a reconfiguration failure message, or a reset message, or information in a cell update message (e.g., an information element (IE)), or information in a remaining segment of the multi-segment signaling message such that the UE and network communicate using the updated UE configuration information. In other words, in this case, the UE coordinates with the network to discard the first reconfiguration message.

Thus, according to one of the present aspects, the UE and/or network entity do not continue to process a multi-segment signaling message associated with stale UE configuration information (e.g., which is no longer current) that became stale due to a subsequent update.

In another specific example, the UE may receive a reconfiguration message with updated UE configuration information when the UE is in the middle of sending a multi-segment signaling message, such as an IDT, associated with different UE configuration information. In this case, the UE may prevent proceeding with the reconfiguration requested by the network until after the UE sends the entire multi-segment signaling message using the first UE configuration.

Thus, according to another one of the present aspects, the UE does not act on a new reconfiguration message when at least one segment of a prior multi-segment signaling message associated with earlier UE configuration information is still pending transmission.

Referring to FIG. 1, in an aspect, a wireless communication system 100 includes UE 101 in communication coverage of a network entity 130 (e.g., a base station or node B (NodeB or NB)). UE 101 can communicate with a network 160 via network entity 130 and a radio network control (RNC) 150. In an aspect, UE 101 may have established one or more uplink channels 173 for sending control (e.g., signaling) and/or data transmissions 175 to network entity 130, and one or more downlink channels 171 for receiving control (e.g., signaling) and/or data messages 177 via network entity 130. In an aspect, the data transmission 175 may be sent through signaling radio bearers. For example, in an aspect, UE 101 and or network entity 130 may use signaling radio bearers in channels 171, 173 to sent signaling messages as data transmissions 175. The signaling messages may include configuration information for UE 101; as such, only the signaling messages that contain the most current configuration information for UE 101 may be considered current, while other signaling messages may be considered stale.

In an aspect, UE 101 may include one or more processors 103 that may operate in combination with message configuration conflict manager (MCCM) 120 for executing various functions for handling messages between UE 101 and the network entity 130 and for identifying and handling potential UE configuration conflicts, as described herein. In an aspect, the one or more processors 103 can include a modem 108 that uses one or more modem processors. The various functions related to MCCM 120 may be included in modem 108 and/or processors 103 and, in an aspect, can be executed by a single processor, while in other aspects, different ones of the functions may be executed by a combination of two or more different processors. For example, in an aspect, the one or more processors 103 may include any one or any combination of a modem processor, or a baseband processor, or a digital signal processor, or a transmit processor, or a transceiver processor associated with transceiver 106. In particular, the one or more processors 103 may execute functions included in MCCM 120, including a configuration conflict identifier function (CCIF) 122 for identifying UE configuration conflicts relating to signaling messages being transmitted and/or received at UE 101, and a message-handling function 124 for managing processing of the signaling messages sent between UE 101 and network entity 130 when such UE configuration conflicts are detected.

In an aspect, MCCM 120 may include hardware and/or software code executable by processor 103 for identifying pending signaling messages that correspond to one or more UE configurations for UE 101 and for managing how and/or if the pending signaling messages are processed to ensure that UE 101 and network entity 130 are in sync with respect to the UE configuration for UE 101.

In an aspect, for example, MCCM 120 may be configured to send and/or receive signaling messages, such as a multi-segment sequence of packets (e.g., protocol data units) that together constitute a service data unit (SDU). For example, the signaling message may be a reconfiguration message received at UE 101 from network entity 130 or a measurement report relating, for example, to the active set of the UE. In an aspect, the signaling message may be an initial direct transfer (IDT) message transmitted by UE 101 to network entity 130. In an aspect, an IDT message may include a service request, such as for setting up a call.

In an aspect, MCCM 120 can be configured to use CCIF 122 and/or message-handling function 124 to determine, for example, if a UE configuration is stale. For example, a first signaling message associated with a first state and a first configuration is sent between UE 101 and network entity 130. In an aspect, MCCM 120 may determine whether the first signaling message is stale by determining whether the second signaling message is received or transmitted while a first signaling message associated with the first UE state and first UE configuration is still pending receipt, transmission, or acknowledgement, respectively. For example, in one case, the first signaling message may be a single segment or a multi-segment first reconfiguration message associated with a first UE configuration. When the first signaling message is a multi-segment message, for example, the UE may partially receive the message while the UE is in the first UE state (e.g., Cell_FACH or Cell_PCH state). In an aspect, the first signaling message may not be fully received or transmitted successfully. For example, not all parts of the multi-segment message may have been transmitted by the transmitting device or received by the receiving device. In another example, the message may have been received by the recipient device, but the transmitting device may not have received an acknowledgement message confirming the successful reception of the message by the recipient device. In an aspect, the second signaling message may be a subsequent, fully-received second reconfiguration message associated with the second UE state and second UE configuration sent to the UE, in response to a cell update by the UE, while at least one segment of the first reconfiguration message is still pending receipt. Further, for example in another case, the first signaling message may be a multi-segment IDT message associated with a first UE state and first UE configuration transmitted by the UE in response to receiving a page, and the second signaling message may be a reconfiguration message associated with a second UE state and second UE configuration received by the UE while at least one segment of the IDT message is still pending transmission.

In an aspect, CCIF 122 may include hardware and/or software code executable by processor 103 for identifying such potential conflicts in UE configuration information in different signaling messages received at and/or transmitted by UE 101. For example, CCIF 122 may operate to for example, detect differences in configuration information as follows. In an aspect, for example, UE 101 may receive UE configuration information from network entity 130 and MCCM 120 may be configured to store the UE configuration information in a memory of UE 101. In an aspect, UE 101 can be configured to retrieve the stored UE configuration information from memory. For example, UE 101 can produce PDUs such that contents of the message include or are based on at least portions of the retrieved UE configuration information. In an aspect, the UE configuration information can include identification information, such as a Radio Network Temporary Identifier (RNTI) associated with UE 101. Subsequently, UE 101 may receive updated UE configuration information from network entity 130 (that may include updated identification information, e.g., a newly-assigned RNTI) or, when UE 101 moves to a new cell that is covered by a different network entity, for example, UE 101 may receive new UE configuration information from the new network entity. For example, CCIF 122 may be configured to compare the identification information of the first signaling message with the identification information of the second signaling message. As such, CCIF 122 may be configured to examine the different signaling messages and corresponding associated UE configuration information and determine potential conflicts in the UE configuration. As such, CCIF 122 can identify the conflicting UE configuration information and can trigger operation of message-handling function 124 to ensure that UE 101 and network entity 130 are in sync with respect to signaling messages and UE configuration information. In an aspect, as another example, CCIF 122 may be configured to recognize an event that triggers the UE to perform a cell update procedure while the UE includes unsent messages, message segments that include older UE configuration information, and/or unsuccessfully received or transmitted messages (e.g., instances where no acknowledgement message associated with the message transmission has either been sent or received). In such instances, CCIF 122 may identify the conflict without comparing the contents of the configuration information, as CCIF 122 may identify that the event would result in new configuration information.

In an aspect, message-handling function 124 may include hardware and/or software code executable by processor 103 for handling signaling messages sent between UE 101 and network entity 130. In an aspect, for example, message-handling function 124, in response to a UE configuration conflict identification from CCIF 122, may control the manner in which UE 101 processes one or more signaling messages to ensure that UE 101 and network entity 130 maintain synchronization with regard to the UE configuration information of UE 101. For instance, in one aspect, message-handling function 124 may initiate actions at UE 101 to cause network entity 130 to stop processing (e.g., stop processes based on the included configuration information) related to a partially received multi-segment first signaling message (e.g., first reconfiguration message) associated with stale UE configuration information when a cell update related to a second signaling message and new UE configuration is already pending. For example, when the first signaling message is a reconfiguration message, UE 101 may begin a reconfiguration process based on the information included in the partially-received message. Message-handling function 124 may trigger UE 101 to stop the reconfiguration process based on the conflict identified by CCIF 122.

In another aspect, for example, message-handling function 124 may, when UE 101 is sending a multi-segment first signaling message, identify unsent message segments associated with the stale UE configuration and may purge the messages when directed by MCCM 120. For example, in an aspect, message-handling function 124 may initiate actions at UE 101 to cause network entity 130 to stop processing related to a signaling message (e.g., a reconfiguration message) associated with new UE configuration information that is received by UE 101 while at least one segment of an earlier multi-segment signaling message (e.g., an IDT message) associated with current UE configuration information is still being transmitted by UE 101. Detailed examples of the operation of message-handling function 124 are described below.

Moreover, in an aspect, UE 101 may include RF front end 104 and transceiver 106 for receiving and transmitting radio transmissions, including, for example, the described signaling messages and also any messages corresponding to the operation of MCCM 120. For example, transceiver 106 may communicate with modem 108 to transmit messages generated by MCCM 120 and to receive messages and forward them to MCCM 120. RF front end 104 may be connected to one or more antennas 102. RF front end 104 can include, for example, one or more low-noise amplifiers (LNAs) 141, one or more switches 142, 143, 146, one or more power amplifiers (PAs) 145, and one or more filters 144 for transmitting and receiving RF signals on the uplink channels 173 and downlink channels 171. RF front end 104 is merely an example configuration; in an aspect, other configurations for RF front end 104 can be used by UE 101. In an aspect, components of RF front end 104 can connect with transceiver 106. Transceiver 106 may connect to one or more modems 108 and processor 103.

In an aspect, LNA 141 can amplify a received signal at a desired output level. In an aspect, each LNA 141 may have a specified minimum and maximum gain values. In an aspect, RF front end 104 may use one or more switches 142, 143 to select a particular LNA 141 and its specified gain value based on a desired gain value for a particular application.

Further, for example, one or more PA(s) 145 may be used by RF front end 104 to amplify a signal for an RF output at a desired output power level. In an aspect, each PA 145 may have a specified minimum and maximum gain values. In an aspect, RF front end 104 may use one or more switches 143, 146 to select a particular PA 145 and its specified gain value based on a desired gain value for a particular application.

Also, for example, one or more filters 144 can be used by RF front end 104 to filter a received signal to obtain an input RF signal. Similarly, in an aspect, for example, a respective filter 144 can be used to filter an output from a respective PA 145 to produce an output signal for transmission. In an aspect, each filter 144 can be connected to a specific LNA 141 and/or PA 145. In an aspect, RF front end 104 can use one or more switches 142, 143, 146 to select a transmit or receive path using a specified filter 144, LNA 141, and/or PA 145, based on a configuration as specified by transceiver 106 and/or processor 103.

Transceiver 106 may be configured to transmit and receive wireless signals through antenna 102 via RF front end 104. In an aspect, transceiver may be tuned to operate at specified frequencies such that UE 101 can communicate with, for example, network entity 130. In an aspect, for example, modem 108 can configure transceiver 106 to operate at a specified frequency and power level based on the UE configuration of the UE 101 and communication protocol used by modem 108.

In an aspect, modem 108 can be a multiband-multimode modem, which can process digital data and communicate with transceiver 106 such that the digital data is sent and received using transceiver 106. In an aspect, modem 108 can be multiband and be configured to support multiple frequency bands for a specific communications protocol. In an aspect, modem 108 can be multimode and be configured to support multiple operating networks and communications protocols. In an aspect, modem 108 can control one or more components of UE 101 (e.g., RF front end 104, transceiver 106) to enable transmission and/or reception of signals from the network based on a specified modem configuration. In an aspect, the modem configuration can be based on the mode of the modem and the frequency band in use. In another aspect, the modem configuration can be based on UE configuration information associated with UE 101 as provided by the network during cell selection and/or cell reselection.

In some aspects, UE 101 may also be referred to by those skilled in the art (as well as interchangeably herein) as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. A UE 101 may be a cellular phone, a smartphone, a tablet computer, a personal digital assistant (PDA), a wireless modem, a wireless communication device, a handheld device, a tablet computer, a laptop computer, a cordless phone, a wireless local loop (WLL) station, a global positioning system (GPS) device, a multimedia device, a video device, a digital audio player (e.g., MP3 player), a camera, a game console, a wearable computing device (e.g., a smart-watch, smart-glasses, a health or fitness tracker, etc), an appliance, a sensor, a vehicle communication system, a medical device, a vending machine, a device for the Internet-of-Things, or any other similar functioning device.

In an aspect, other devices in the wireless communication system 100, such as network entity 130, can include and implement MCCM 120. For instance, network entity 130 can be configured to handle mismatches between messages and UE configurations and use MCCM 120 to identify mismatches and use updated UE configuration information in messages sent to UE 101.

Referring to FIGS. 2-5, in an operational aspect, a UE such as UE 101 (FIG. 1) may perform one or more of methods 200, 200' (FIGS. 2A-2B) and methods 300, 300' (FIGS. 3A-3B), which relate to methods of handling messages in wireless communication, which is now described with reference to signal and state diagrams illustrated in FIGS. 4A-4E and 5A-5B. While, for purposes of simplicity of explanation, the methods are shown and described as a series of acts, it is to be understood and appreciated that the methods (and further methods related thereto) are not limited by the order of acts, as some acts may, in accordance with one or more aspects, occur in different orders and/or concurrently with other acts from that shown and described herein. For example, it is to be appreciated that each method could alternatively be represented as a series of interrelated states or events, such as in a state diagram. Moreover, not all illustrated acts may be required to implement each method in accordance with one or more features described herein. In an aspect, methods 200, 300 may be implemented by UE 101 executing MCCM 120 and/or one or more of its sub-functions as described herein.

Figure 2A:
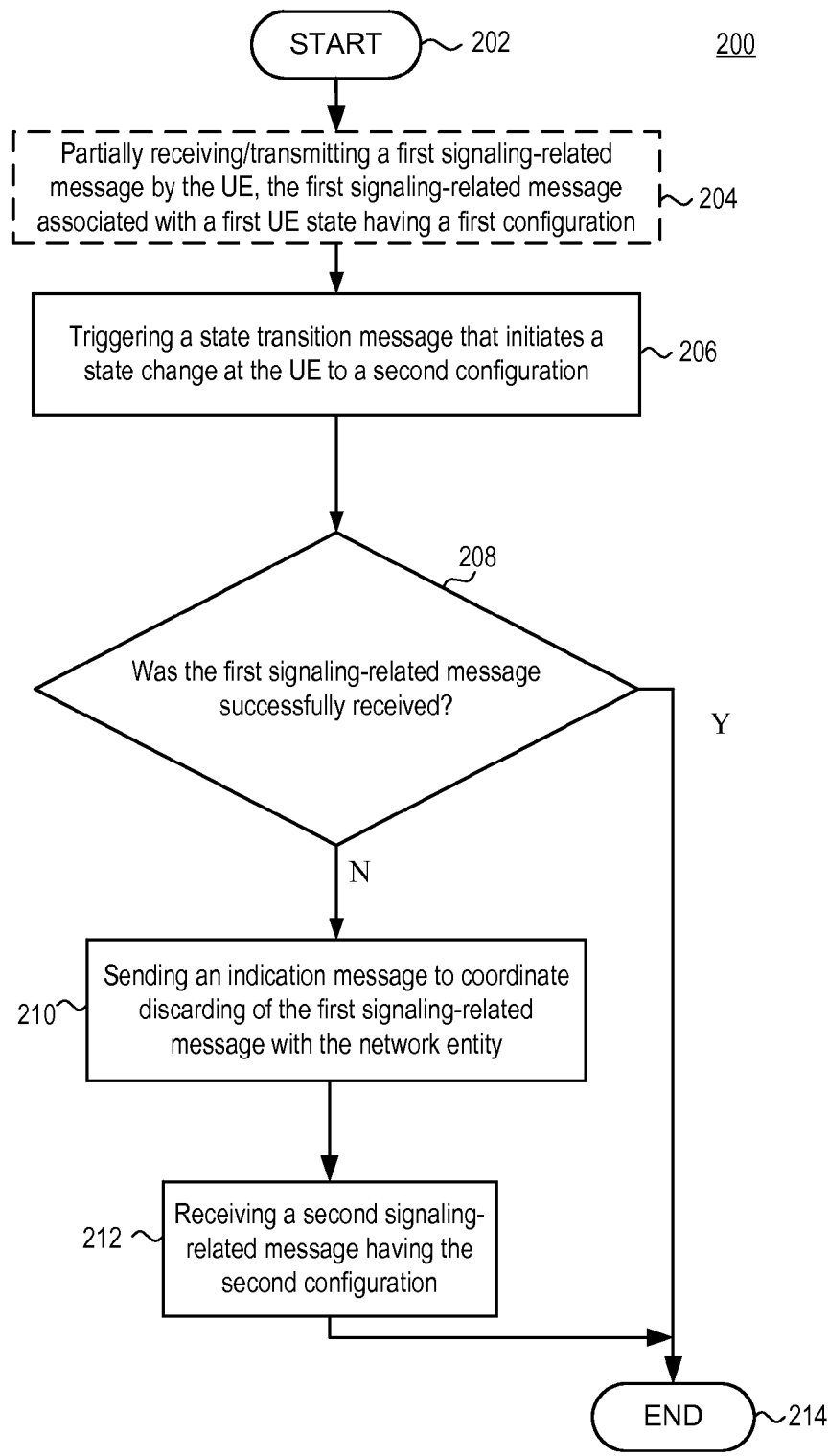
FIGS. 2A-2B are flow diagrams illustrating example methods of handling reception of signaling-related messages in relation to a performing a cell update.

FIG. 2A is a flow diagram illustrating an example method 200 used by a UE for handling a first signaling-related message associated with a first UE configuration in relation to second UE configuration that is different from the first UE configuration. Method 200 involves UE 101 partially receiving or transferring a first signaling-related message, triggering a transition that causes a change in UE configuration, and upon determining that the first signaling-related message was not successfully received (e.g., a portion of a multi-segment message was not received, an acknowledgement for a sent message was not received, etc.), sending an indication message to coordinate discarding at least the unsent message segment. In an aspect, method 200 involves UE 101 receiving a subsequent signaling-related message having a second UE configuration. Thus, method 200 enables UE 101 to maintain UE configuration information in synchronization with network entity 130.

In an aspect, method 200 starts at block 202. At block 204, method 200 may include partially receiving or transmitting a first signaling-related message by the UE. For example, in an aspect, one or more of antenna 102, RF front end 104, transceiver 106, one or more processor(s) 103, modem 108, MCCM 120, and CCIF 122 of UE 101 may be configured to send or receive a first signaling-related message associated with a first UE state having a first UE configuration. In an aspect, the first signaling-related message may be transferred via a signaling radio bearer. In an aspect, the first signaling-related message may be a multi-segment message, such as a reconfiguration message that may include, may reference, or may be based on information for the first UE configuration. In as aspect, the first signaling-related message may a complete message, such as, for example, a measurement report that includes information relating to one or more UE configurations (e.g., a measurement report including an event 1C to add a new cell or change the UE configuration).

In an aspect, the UE configuration information includes information such as, but not limited to, identification information (e.g., a network-assigned radio network temporary identifier (RNTI)) for UE 101 for use in configuring UE 101 for communications with a network entity. In an aspect, for an example multi-segment message, each of the service data unit (SDU) sequence portions can be transmitted from the network as a protocol data unit (PDU) and include in its contents all or some part of the first UE configuration information for a first UE configuration, such as the current UE identifier (e.g., a current RNTI). In an aspect, UE 101 may be in a CELL_RACH or a CELL_PCH state when it receives the message segments associated with the first UE configuration. Similarly, a measurement report can include UE configuration and UE 101 may be in a CELL_RACH or CELL_PCH state when it transmits the measurement report to the network.

In an aspect, at block 206, method 200 may include triggering a state transition message that initiates a state transition at the UE to a second UE configuration. For example, in an aspect, UE 101 may be configured to trigger a state change to a second UE state having a second UE configuration. In an aspect, the state transition message may be a message that triggers the network to assign updated UE configuration information (e.g., associated with the second UE configuration). The state transition message may include (but is not limited to) a cell update message. Moreover, the triggering of the state transition message may result in a transmission from UE 101 to network entity 130, and may include components of UE 101 configured for transmitting, such as modem 108, one or more processor(s) 103, transceiver 106, RF front end 104, and/or antenna 102. In an aspect, for example, prior to initiating the state change, UE 101 may perform steps related to an event (e.g., cell reselection, radio link failure, re-entry into cell service area, etc.) that causes the triggering of the state transition message. For example, a cell reselection procedure may include UE 101 selecting a new cell that would support UE 101 within the network. The cell reselection procedure may trigger UE 101 to perform a cell update procedure. When performing the cell update procedure, UE 101 may be in a CELL_RACH state. The cell update procedure may in turn trigger the network to provide the updated, second UE configuration. In an aspect, a radio link failure may include UE 101 determining that a link to the network has failed. This may occur, for example, when UE 101 fails to receive a message from the network (e.g., an acknowledgement message as a response to a measurement report sent by the UE).

In an aspect, a different network entity may assign the updated UE configuration information. The second UE configuration may include, may reference, or may be based on new UE configuration information, such as, for example, new identification information (e.g., a new RNTI) for UE 101. In an aspect, for example, UE 101 may send a cell update message to the network. The network may respond by sending a cell update confirm message that includes the updated UE configuration information associated with the new, second UE configuration. In an aspect, UE 101 and network entity 130 may discard the updated configuration information included in the Cell Update Confirm message. In such instances, the network entity may generate newer, more updated configuration information (including, e.g., a newer RNTI) in a subsequent reconfiguration message that is sent to UE 101 after the cell update procedure.

In an aspect, at block 208, method 200 may include determining whether the first signaling-related message was successfully received. For example, MCCM 120 and/or CCIF 122 may be configured to determine whether there is a conflict in configuration information based on the status of the first signaling-related message.

For example, MCCM 120 and/or CCIF 122 may, upon partial receipt of a multi-segment message, identify a conflict between UE configurations in the first signaling message (e.g., the first reconfiguration message) and the second signaling message (e.g., the state transition message, such as a cell update message). For instance, CCIF 122 can identify a first UE configuration information, including, for example, identification information (e.g., RNTI) associated with the received segments of the multi-segmented SDU representing the first signaling message and can identify that the state transition message will be or is associated with a second UE configuration that includes new identification information. As such, CCIF 122 may identify a conflict in portions of UE configuration information between the signaling messages, including, for example, conflicting identification information (e.g., mismatched RNTI values). For example, the reception by UE 101 of the remaining segment(s) of the multi-segment SDU associated with the first UE configuration would result in UE 101 receiving a reconfiguration message that includes stale UE configuration information (e.g., relating to the first UE configuration), which is not synchronized with the latest UE configuration based on the state transition message. If this is the case, then MCCM 120 will proceed to manage the partially-received multi-segmented SDU representing the first signaling message.

If at block 208 a determination is made that the first signaling-related message was successfully received, then method 200 can end at block 214. Alternatively, when MCCM 120 determines that the first signaling-related message was not successfully received, method 200 may proceed to block 210.

In another example, MCCM 120 and/or CCIF 122 may, after transmitting of a measurement report (e.g., a measurement report including an event 1C in an information element (IE)) at block 204, determine at block 208 that an acknowledgement (ACK) for the transmitted measurement report was never received from network entity 130. In such instances MCCM 120 and/or CCIF 122 of UE 101 may determine that, due to not receiving the ACK for the measurement report, the measurement report was not received. This may cause UE 101 to determine that a radio link failure occurred. In an aspect, when UE 101 sends the measurement report, UE 101 may optionally perform block 208 before block 206. In such instances, when MCCM 120 and/or CCIF 122 of UE 101 determines that the first signaling-related message was not successfully received, UE 101 may trigger the state transition message before proceeding to block 210. Upon determination of the occurrence of a radio link failure, CCIF 122 may identify a conflict in UE configuration information, as the sent measurement report contains stale UE configuration information and would trigger the network to generate a new configuration based on the information included in the measurement report after new configuration information was already provided due to the radio link failure. If this is the case, then MCCM 120 may proceed to manage measurement report that was sent to the network entity 130.

In an aspect, at block 210, method 200 may include sending an indication message to coordinate discarding of the first signaling-related message with the network entity. For example, in an aspect, MCCM 120 and/or message-handling function 124 of UE 101 may be configured to generate and send (e.g., via modem 108, one or more processor(s) 103, transceiver 106, RF front end 104, and/or antenna 102) a message to network entity 130 based the determination made at block 208. In an aspect, the message generated by message-handling function 124 may include, but is not limited to, a message such as a modified cell update message (e.g., including an additional information element), a reconfiguration failure message, a reset message, or a negative acknowledgement (NACK) message. Specific examples of UE implementations that utilize these messages are described below with respect to FIGS. 4A-4E. UE 101 and/or network entity 130 may, based on the indication message, delete messages and/or message segments that include the stale configuration information.

In an aspect, at block 212, method 200 may include receiving a second signaling message associated with the second UE state and the second UE configuration. For example, in an aspect, UE 101 (using antenna 102, RF front end 104, transceiver 106, one or more processor(s) 103, modem 108, and/or MCCM 120) may be configured to receive a second signaling-related message associated with the second UE state and the second UE configuration. In an aspect, MCCM 120 may use message-handling function 124 to receive a signaling-related message associated with the second UE configuration. In such instances, CCIF 122 may identify no UE configuration conflict (e.g., the identification information matched) and UE 101 may respond to the received message. In an aspect, for example, UE 101 may receive an entire sequence of a multi-segment message that includes information for the second UE configuration. In an aspect, the second signaling message may be a single reconfiguration message. In an aspect, the UE 101 may be in a CELL_RACH or CELL_PCH state when receiving the second signaling message. After receiving the second signaling-related message, method 200 can end at block 214.

Figure 2B:
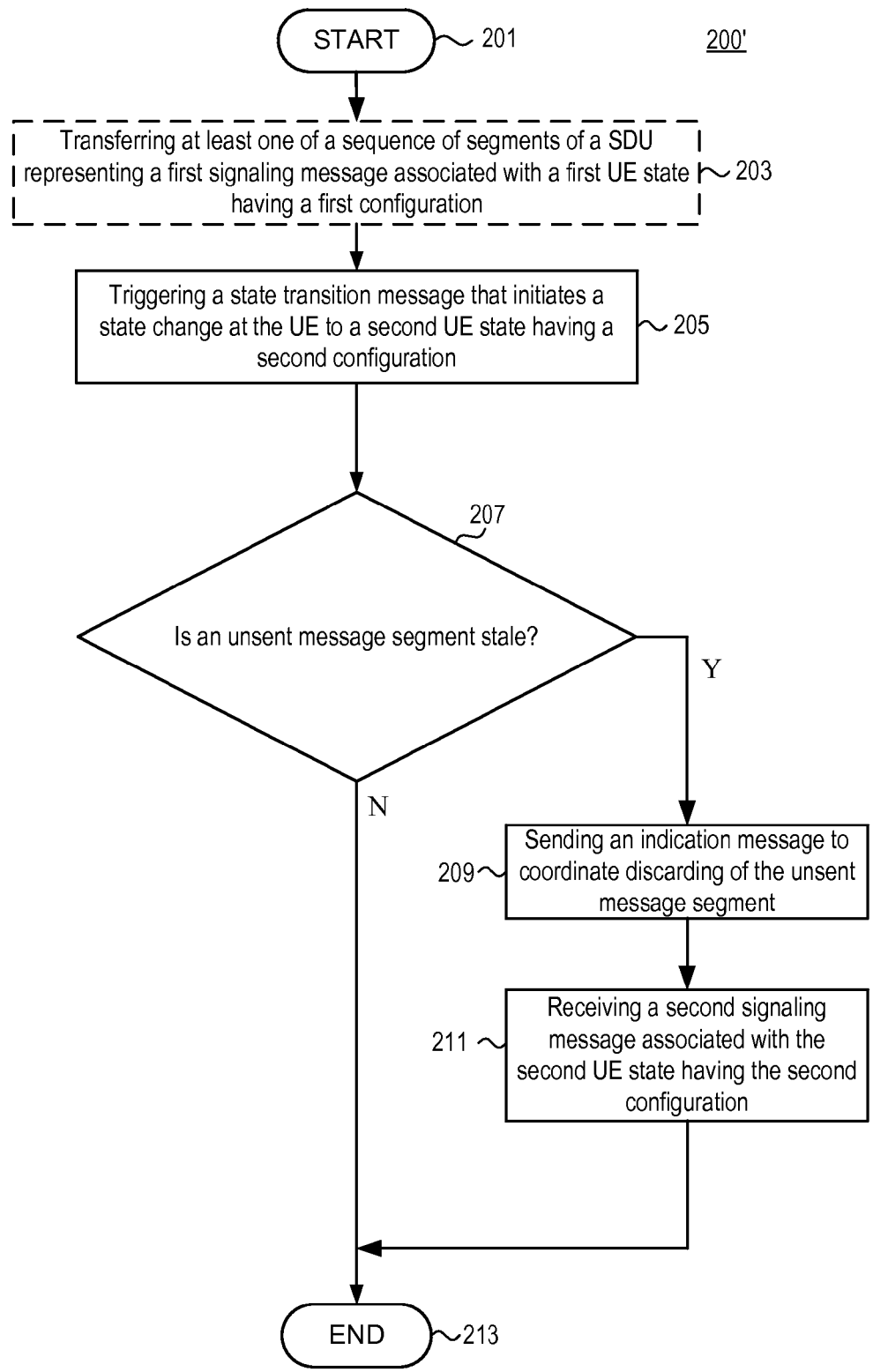

FIG. 2B is a flow diagram illustrating an example method 200' used by a UE for handling a first signaling message associated with a first UE configuration in relation to second UE configuration. Method 200' may be a more detailed example of UE 101 implementing aspects of method 200 as described in FIG. 2A. Method 200' involves UE 101 optionally transferring a portion of a multi-segment message, triggering a transition that causes a change in UE configuration, and upon determining that at least one unsent segment of the multi-segment message is stale, sending an indication message to coordinate discarding at least the unsent message segment. In an aspect, method 200' also involves UE 101 receiving a subsequent signaling message associated with the change in UE configuration. Thus, method 200' enables UE 101 to maintain UE configuration information in synchronization with network entity 130.

In an aspect, method 200' starts at block 201. At block 203, method 200' may optionally include transferring at least one of a sequence of segments of a SDU representing a first signaling message associated with a first UE state and a first UE configuration. For example, in an aspect, one or more of antenna 102, RF front end 104, transceiver 106, one or more processor(s) 103, modem 108, MCCM 120, and/or CCIF 122 of UE 101 may be configured to receive at least one of a sequence of segments of a SDU representing a first signaling message associated with a first UE state having a first UE configuration. For instance, the first signaling message may be a reconfiguration message, which may include, may reference, or may be based on first UE configuration information. In an aspect, the UE configuration information includes information such as, but not limited to, identification information (e.g., a RNTI) for UE 101 for use in configuring UE 101 for communications with a network entity. In an aspect, each of the SDU sequence portions can be transmitted from the network as a PDU and include in its contents all or some part of the first UE configuration information for a first UE configuration, such as the current UE identifier (e.g., a current RNTI). In an aspect, UE 101 may be in a CELL_RACH or a CELL_PCH state when it receives or receives the message segments associated with the first UE configuration.

In an aspect, at block 205, method 200' may include triggering a state transition message that initiates a state transition at the UE to a second UE state and a second UE configuration. For example, in an aspect, UE 101 may be configured to trigger a state transition message; the state transition message initiates a state change to a second UE state having a second UE configuration. In an aspect, the state transition message may be a message that triggers the network to assign updated UE configuration information (e.g., associated with the second UE configuration). The state transition message may include (but is not limited to) a cell update message. Moreover, the triggering of the state transition message may result in a transmission from UE 101 to network entity 130, using components such as modem 108, one or more processor(s) 103, transceiver 106, RF front end 104, and/or antenna 102.

In an aspect, for example, prior to initiating the state change, UE 101 may perform steps related to an event (e.g., cell reselection, radio link failure, re-entry into cell service area, etc.) that causes the triggering of the state transition message. For example, a cell reselection procedure may include UE 101 selecting a new cell that would support UE 101 within the network. The cell reselection procedure may trigger UE 101 to perform a cell update procedure. When performing the cell update procedure, UE 101 may be in a CELL_RACH state. The cell update procedure may in turn trigger the network to provide the updated, second UE configuration.

In an aspect, a different network entity may assign the updated UE configuration information. The second UE configuration may include, reference, or be based on new UE configuration information, such as, for example, new identification information, for example, a new RNTI, for UE 101. In an aspect, for example, UE 101 may send a cell update message to the network. The network may respond by sending a cell update confirm message that includes the updated UE configuration information associated with the new, second UE configuration. In an aspect, the UE 101 and network entity may discard the updated configuration information included in the Cell Update Confirm message. In such instances, the network entity may generate newer, more updated configuration information (including, e.g., a newer RNTI) in a subsequent reconfiguration message that is sent to UE 101 after the cell update procedure.

In an aspect, at block 207, method 200' may including determining whether an unsent message segment is stale. For example, MCCM 120 and/or CCIF 122 may be configured to determine whether there is a conflict between UE configurations in the partially-received SDU (e.g., the first reconfiguration message) and the second signaling message (e.g., the state transition message, such as a cell update message). For instance, CCIF 122 can identify a first UE configuration information (including, e.g., a RNTI) associated with the received segments of the multi-segmented SDU representing the first signaling message and can identify that the state transition message will be or is associated with a second UE configuration (and will or does include a new RNTI). As such, CCIF 122 may identify a conflict in UE configuration information (e.g., mismatched identification information) between the signaling messages. For example, the reception by UE 101 of the remaining (e.g., unsent) segment(s) of the multi-segment SDU associated with the first UE configuration would result in UE 101 receiving a reconfiguration message that includes stale UE configuration information (e.g., relating to the first UE configuration), which is not synchronized with the latest UE configuration based on the state transition message. If this is the case, then MCCM 120 will proceed to manage how to handle the partially-received multi-segmented SDU and/or unsent SDUs representing the first signaling message.

If at block 207 a determination is made that there are no stale unsent message segments, then method 200' can end at block 213. Alternatively, when a conflict between UE configuration information is detected by MCCM 120 and/or CCIF 122, method 200' may proceed to block 209.

In an aspect, at block 209, method 200' may include sending an indication message to coordinate discarding of the first signaling message. For example, in an aspect, MCCM 120 and/or message-handling function 124 of UE 101 may be configured to generate and send (e.g., via modem 108, one or more processor(s) 103, transceiver 106, RF front end 104, and/or antenna 102) a message to network entity 130 based the determination made at block 207. In an aspect, the message generated by message-handling function 124 may include, but is not limited to, a message such as a modified cell update message (that may include, for example, an additional information element), a reconfiguration failure message, a reset message, or a negative acknowledgement (NACK) message that indicate that network entity 130 should discard any partially-received message segments. Specific examples of implementations that utilize these messages is described below with respect to FIGS. 4A-4E. UE 101 and/or network entity 130 may, based on the indication message, delete messages and/or message segments that include the stale configuration information.

In an aspect, at block 211, method 200' may include receiving a second signaling message associated with the second UE state and the second UE configuration. For example, in an aspect, one or more of antenna 102, RF front end 104, transceiver 106, one or more processor(s) 103, modem 108, and/or MCCM 120 of UE 101 may be configured to receive a second signaling message associated with the second UE state and the second UE configuration. In an aspect, MCCM 120 may use message-handling function 124 to receive a signaling message associated with the second UE configuration. In such instances, CCIF 122 identifies no UE configuration conflict (e.g., the identification information matched) and UE 101 may respond to the received message. In an aspect, for example, UE 101 may receive an entire sequence of a multi-segment message that includes information for the second UE configuration. In an aspect, the second signaling message may be a single reconfiguration message. In an aspect, the UE 101 may be in a CELL_RACH or CELL_PCH state when receiving the second signaling message. After receiving the second signaling message, method 200' can end at block 213.

Figure 3A:
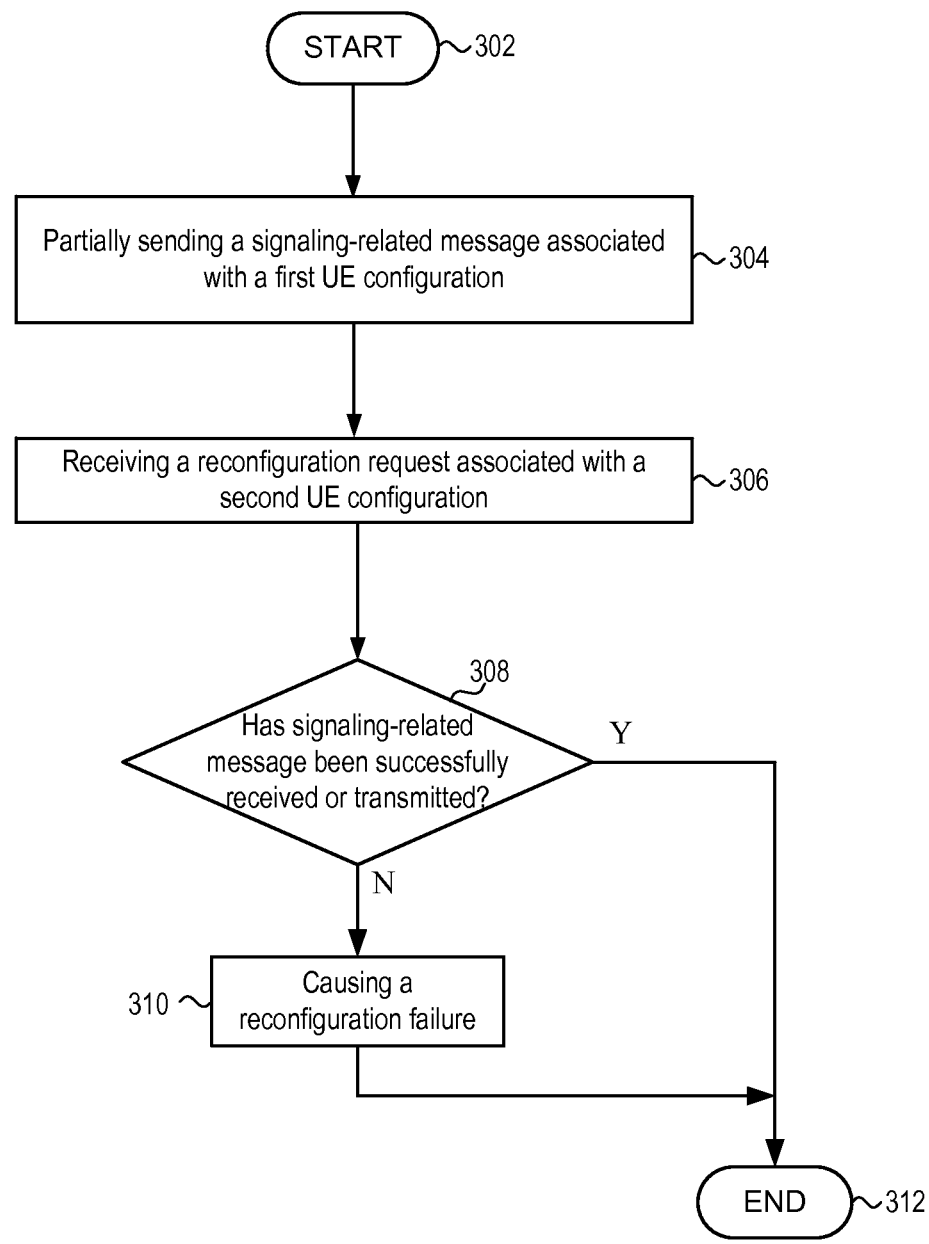
FIGS. 3A-3B are flow diagrams illustrating other example methods of handling transmission of a signaling-related messages in relation to receiving a reconfiguration request.

FIG. 3A is a flow diagram illustrating an example method 300 used by a UE for sending of a first signaling-related message associated with a first UE configuration, such as an IDT message, in relation to receiving a second signaling-related message associated with a second UE configuration, such as a reconfiguration request. Method 300 involves a UE partially sending a signaling-related message to the network and receiving a reconfiguration request from the network before it completes sending the entire signaling-related message. When the UE determines that the signaling-related message was not successfully transmitted or received, the UE can cause a reconfiguration failure to maintain synchronization with network entity 130.

In an aspect, method 300 starts at block 302. At block 304, method 300 may include partially sending a signaling-related message associated with a first UE configuration. For example, in an aspect, MCCM 120 of UE 101 may use message-handling function 124 to send (e.g., via modem 108, one or more processor(s) 103, transceiver 106, RF front end 104, and/or antenna 102) a first signaling-related message, such as an IDT message associated with a first state and a first UE configuration. In an aspect, the first signaling-related message may be transferred via a signaling radio bearer. In an aspect, the UE configuration information includes information such as, but not limited to, an identifier (e.g., a RNTI) for UE 101. In an aspect, UE 101 may be in a CELL_RACH state when it sends the multi-segment first signaling message associated with the first UE configuration.

In an aspect, at block 306, method 300 may include receiving a reconfiguration request associated with a second UE configuration. For example, in an aspect, one or more of antenna 102, RF front end 104, transceiver 106, one or more processor(s) 103, modem 108, MCCM 120, and/or message-handling function 124 of UE 101 may be configured to receive a reconfiguration request. In an aspect, for example, the reconfiguration request is associated with a second UE state and a second UE configuration (e.g., including a new RNTI) for UE 101. In an aspect, the reconfiguration request may include information to trigger UE 101 to move into a CELL_PCH state.

In an aspect, at block 308, method 300 may include determining whether the signaling-related message has been successfully transmitted or received. In an aspect, for example, MCCM 120 and/or CCIF 122 may be configured to determine, for example, whether UE 101 received an acknowledgment (ACK) message associated with the reception of the first signaling-related message by network entity 130. For instance, CCIF 122 may identify the non-reception of the ACK message and identify a conflict in the UE configuration associated with both the partially-transmitted IDT message that includes a RNTI and the received reconfiguration request that includes the new RNTI. For instance, CCIF 122 may determine a UE configuration conflict when the sent IDT message is associated with the first UE configuration and the received reconfiguration request is associated with a different, second UE configuration. CCIF 122 may determine a conflict when contents of the two configurations (e.g., identification information) do not match. When this it is determined that the signaling-related message has been successfully transmitted or received, method 300 can end at block 312; otherwise UE 101 proceed to block 310.

In an aspect, at block 310, method 300 may include causing a reconfiguration failure. For example, in an aspect, UE 101 and/or message-handling function 124 may be configured to cause a reconfiguration failure. In an aspect, for example, MCCM 120 and/or message-handling function 124 may generate and send (e.g., via modem 108, one or more processor(s) 103, transceiver 106, RF front end 104, and/or antenna 102) a reconfiguration failure message as a response to the reconfiguration request to cause network entity 130 to cease the reconfiguration procedure until the entire IDT message (that includes the first UE configuration) is sent. In another aspect, MCCM 120 can send a move receiving window (MRW) message to the network such that the reconfiguration procedure fails. Further, for example, MCCM 120 and/or message-handling function 124 may send the response message while UE 101 is in a CELL_RACH state. Additional details relating to causing a reconfiguration failure are described below with reference to FIGS. 5A-5B. After causing the reconfiguration failure, method 300 can end at block 312.

Figure 3B:
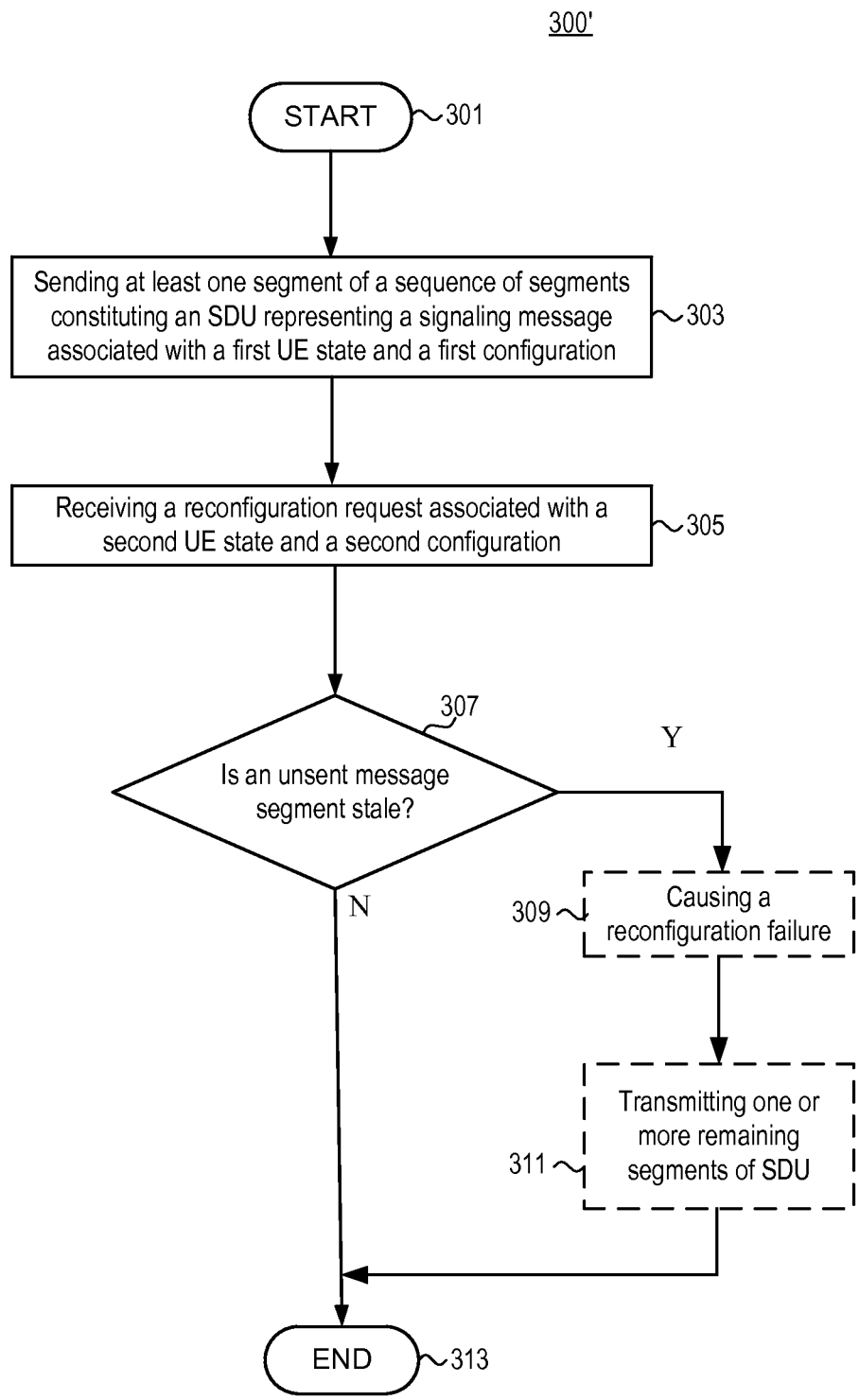

FIG. 3B is a flow diagram illustrating an example method 300' used by a UE for sending of a multi-segment first signaling message associated with a first UE configuration in relation to receiving a second signaling message associated with a second UE configuration. Method 300' is a more detailed example of a UE implementing one or more aspects of method 300. Method 300' involves a UE sending multi-segment message, such as an SDU, to the network and receiving a reconfiguration request from the network before it completes sending the entire multi-segment message. When the UE determines that the entire SDU was not sent, the UE can optionally cause a reconfiguration failure or can optionally use other messages for modification such that an entire segment is sent from the UE using a common UE configuration; this may maintain synchronization with the network.

In an aspect, method 300' starts at block 301. At block 303, method 300' may include sending at least one segment of a sequence of segments constituting an SDU representing a signaling message associated with a first UE state and a first UE configuration. For example, in an aspect, MCCM 120 of UE 101 may use message-handling function 124 to send (e.g., via modem 108, one or more processor(s) 103, transceiver 106, RF front end 104, and/or antenna 102) at least one segment of a multi-segment first signaling message, such as an IDT message associated with a first state and a first UE configuration. In an aspect, UE 101 does not transmit, or network entity 130 does not receive, at least one segment of the multi-segment signaling message. In an aspect, the UE configuration information includes information such as, but not limited to, an identifier (e.g., a network-assigned RNTI) for UE 101. For example, message-handling function 124 of UE 101 can process and send two portions of a three-segment SDU sequence. Each of the SDU sequence portions can be transmitted from UE 101 as a PDU and include in its contents, provide a reference to, or be associated with, first UE configuration information associated with UE 101, such as the current identifier (e.g., the current RNTI). In an aspect, UE 101 may be in a CELL_RACH state when it sends the multi-segment first signaling message associated with the first UE configuration.

In an aspect, at block 305, method 300' may include receiving a reconfiguration request associated with a second UE state and a second configuration. For example, in an aspect, one or more of antenna 102, RF front end 104, transceiver 106, one or more processor(s) 103, modem 108, MCCM 120, and/or message-handling function 124 of UE 101 may be configured to receive a reconfiguration request. In an aspect, for example, the reconfiguration request is associated with a second UE state and a second UE configuration (e.g., including a new RNTI) for UE 101. In an aspect, the reconfiguration request may include information to trigger UE 101 to move into a CELL_PCH state.

In an aspect, at block 307, method 300' may include determining whether an unsent message segment is stale. In an aspect, for example, MCCM 120 and/or CCIF 122 may be configured to determine whether an unsent segment of the multi-segment signaling message is stale subject to any updated configuration information. For instance, CCIF 122 may identify UE configuration information associated with both the unsent portion of the IDT message and the received reconfiguration request. CCIF 122 may determine a UE configuration conflict when the IDT message includes the first UE configuration and the received reconfiguration request includes a different, second UE configuration and the contents of the two UE configurations do not match (e.g., the identification information does not match). When it is determined that the unsent message segment is stale, method 300' may optionally proceed to block 309; otherwise, UE 101 can end method 300' at block 313.

In an aspect, at block 309, method 300' may optionally include causing a reconfiguration failure. For example, in an aspect, UE 101 and/or message-handling function 124 may be configured to cause a reconfiguration failure. In an aspect, for example, MCCM 120 and/or message-handling function 124 may generate and send (e.g., via modem 108, one or more processor(s) 103, transceiver 106, RF front end 104, and/or antenna 102) a reconfiguration failure message as a response to the reconfiguration request to cause the network to cease the reconfiguration procedure until the entire IDT message that includes the first UE configuration is sent. In another aspect, MCCM 120 can send a move receiving window (MRW) message to the network such that the reconfiguration procedure fails. Further, for example, MCCM 120 and/or message-handling function 124 may send the response message while UE 101 is in a CELL_RACH state. Additional details relating to causing a reconfiguration failure are described below with reference to FIGS. 5A-5B.

In an aspect, at block 311, method 300' may optionally include transmitting the one or more remaining segments of the SDU. For example, in an aspect, MCCM 120 and/or message-handling function 124 may be configured to transmit (e.g., via modem 108, one or more processor(s) 103, transceiver 106, RF front end 104, and/or antenna 102) one or more remaining segments of the SDU, such as an IDT message that includes the first UE configuration. Further, for example, the remaining segments of the SDU that are transmitted are associated with the first UE configuration information while UE 101 is in a CELL_RACH state. Once UE 101 completes block 311, method 300' can end at block 313.

FIGS. 4A-4E are signaling diagrams describing flows of messages between devices and device components in accordance with aspects of the present disclosure relating to sending an indication message to coordinate discarding of segments of a first signaling message associated with first UE configuration information when UE 101 is aware of an updated, second UE configuration information at UE 101 and/or NW entity 130 that conflicts with the first UE configuration (see, e.g., FIG. 2A, block 208). For example, in an aspect, diagram 400, 400', 440, 450, and 460 illustrate messages sent between the Radio Resource Control (RRC) Layer Entity 402 and Radio Link Control (RLC) Layer Entity 403 in UE 101 and RLC Entity 405 in network entity 130, based on the cell update of UE 101. The functionality of MCCM 120 discussed above may be implemented, for example, by RRC Layer entity 402 and/or RLC Layer entity 403 of UE 101.

Figure 4A:
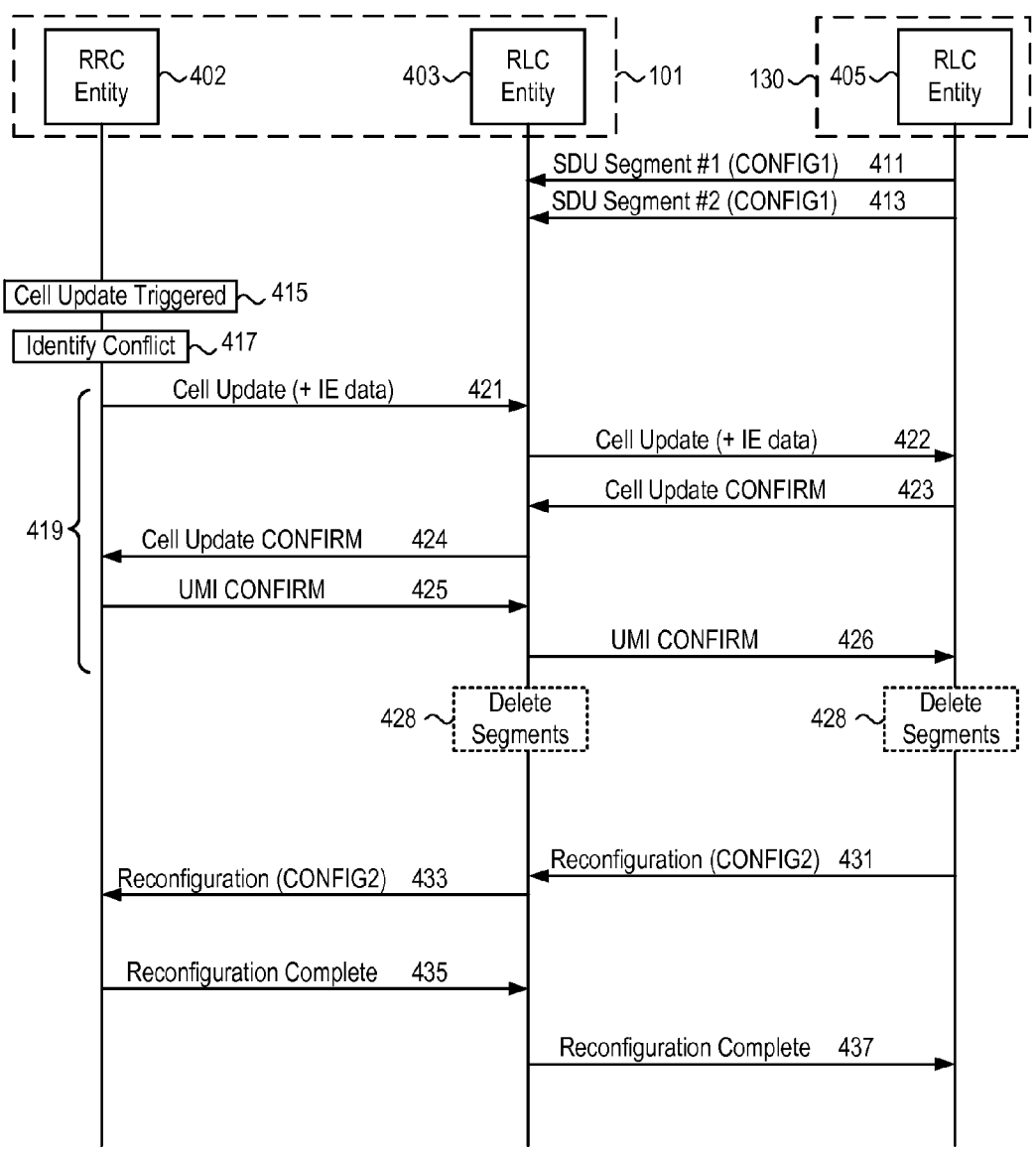
FIGS. 4A-4E are message flow diagrams of example call flows between a user equipment, and corresponding user equipment components, and network entity with respect to aspects of the method of FIGS. 2A-2B.
Figure 4B:
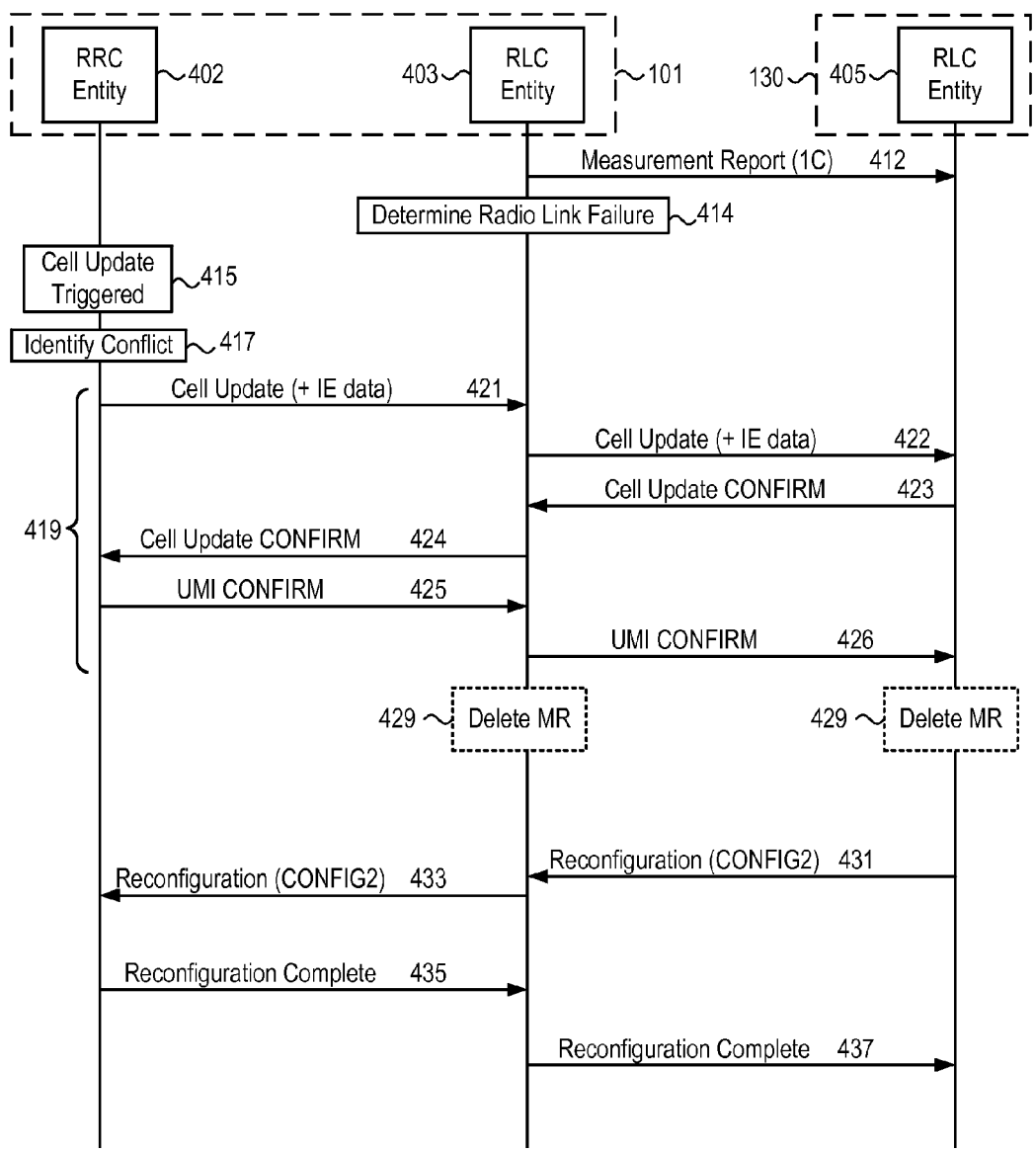
Figure 4C:
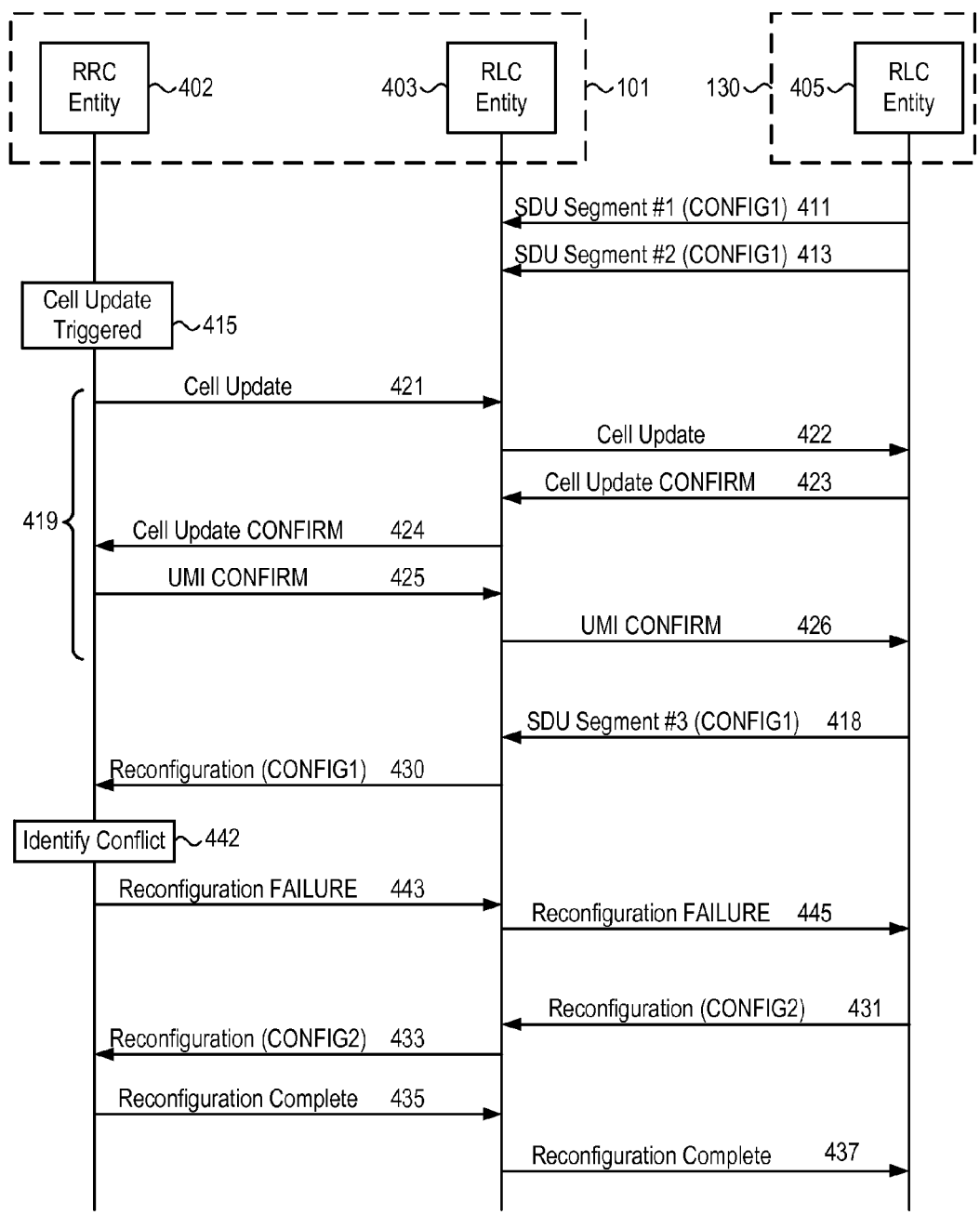
Figure 4D:
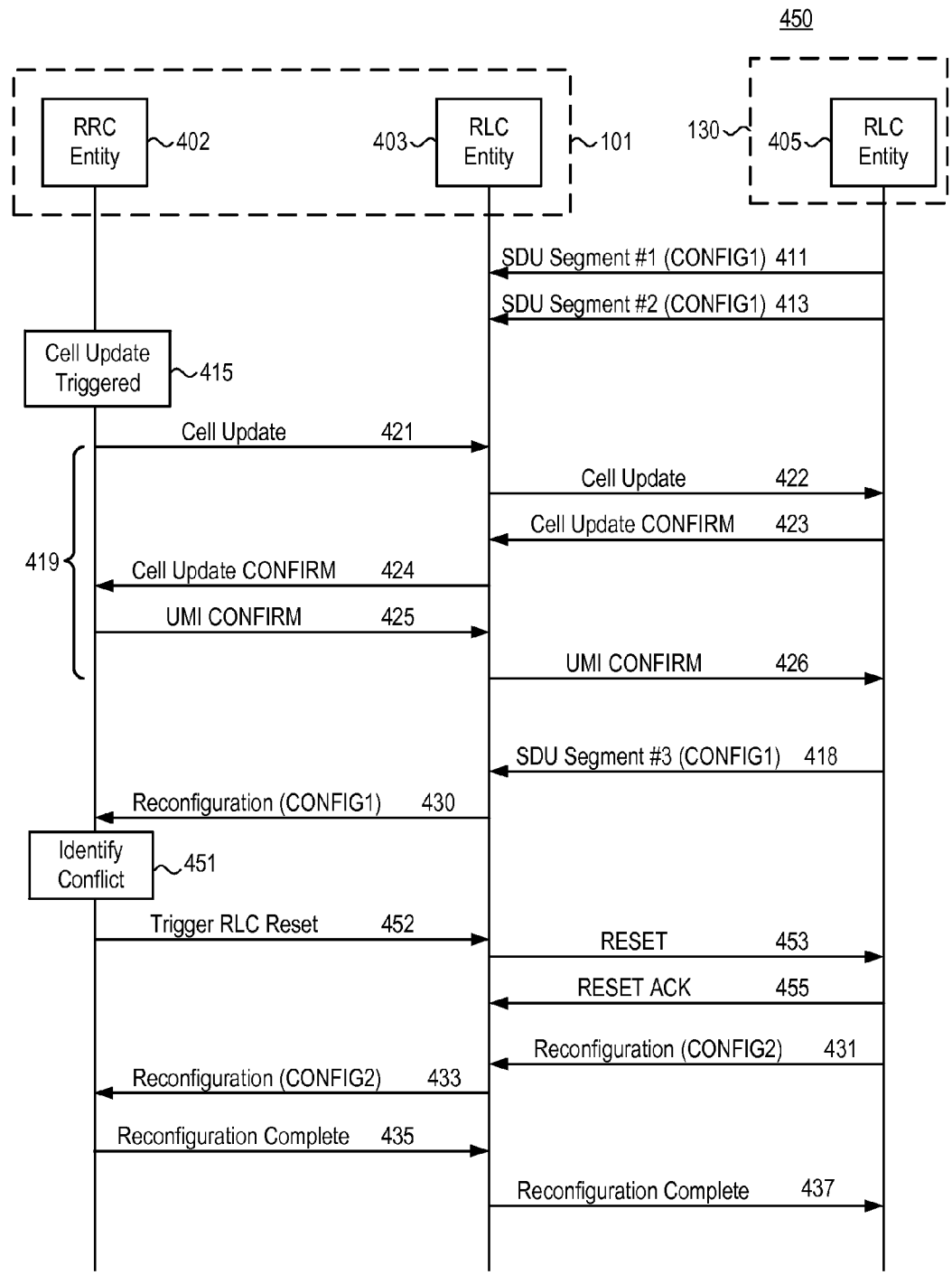
Figure 4E:
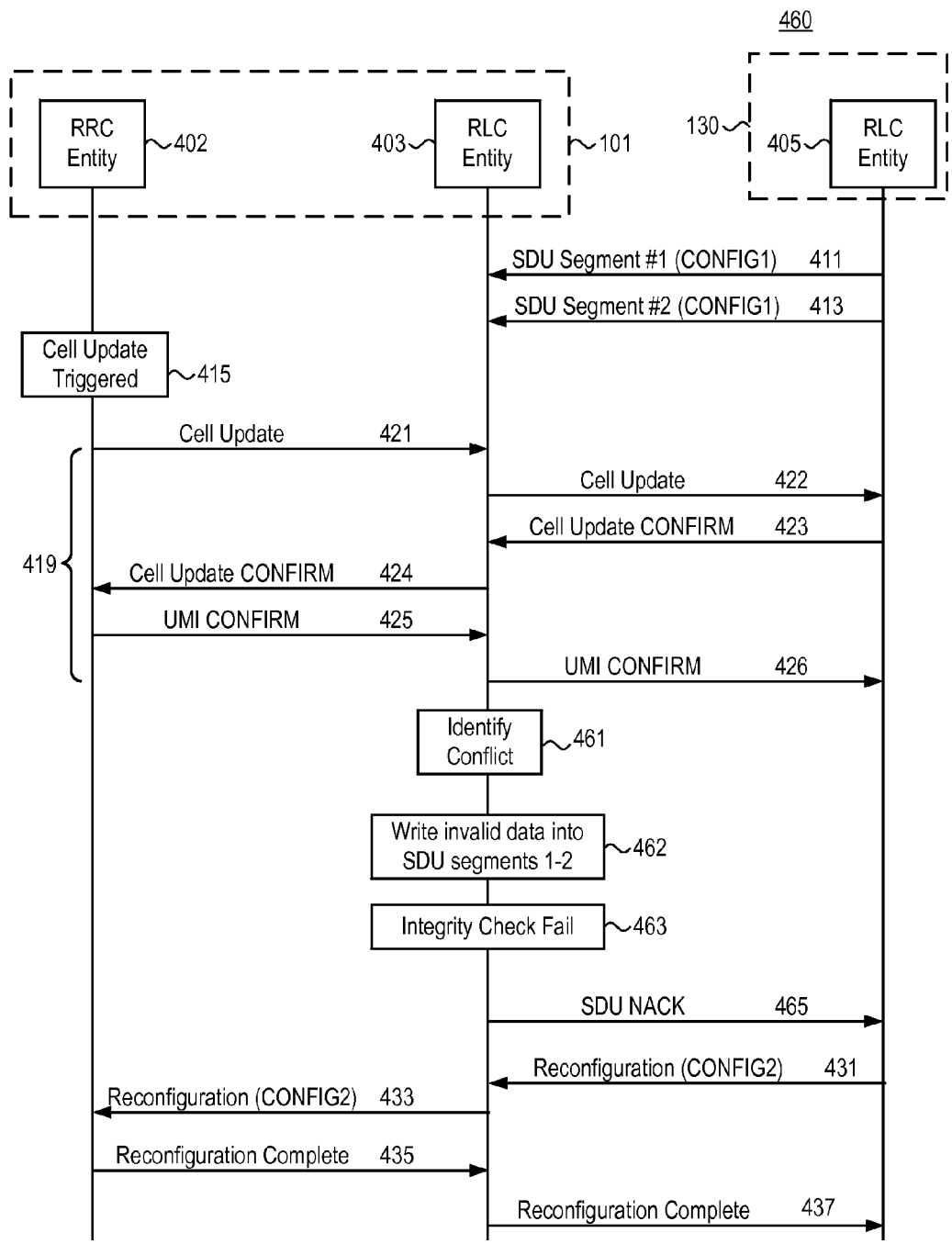

Diagram 400 of FIG. 4A illustrates a signaling flow that identifies a UE configuration conflict and adds additional information about the current UE configuration in an information element (IE) in the cell update message. Diagram 400' of FIG. 4B illustrates a signaling flow that identifies a UE configuration conflict based on a radio link failure associated with sending a measurement report to the network. Diagram 440 of FIG. 4C illustrates a signaling flow that identifies the UE configuration conflict and sends a reconfiguration failure message in response to receiving the entire first signaling message that included stale UE configuration information. Diagram 450 of FIG. 4D illustrates a signaling flow that identifies the UE configuration conflict and sends a reset message in response to receiving the entire first signaling message that included stale UE configuration information. Diagram 460 of FIG. 4E illustrates a signaling flow that identifies the UE configuration conflict and enters invalid data into the received segments, which results in the sending of a negative acknowledgement message and a failure of the reconfiguration procedure using stale UE configuration information.

Referring to diagram 400 of FIG. 4A, in an aspect, for example, when UE 101 is in state such as a CELL_FACH state or a CELL_PCH state, RLC entity 405 can send a signaling message in the form of a multi-segment message. RLC entity 405 can send service data unit (SDU) segments 1 and 2, identified by reference numbers 411 and 413, to RLC entity 403 of UE 101. In an aspect, the SDU can be a reconfiguration message that includes, references, or may be associated with first UE configuration information associated with a first UE state and a first UE configuration (e.g., CONFIG. 1). In an aspect, for example, the SDU can have multiple segments that are each sent between UE 101 and network entity 130 separately. For example, the SDU of flow diagram 400 may have three segments.

At block 415, UE 101 can trigger a cell update. In an aspect, for example, UE 101 can be camped in a cell X (e.g., an enhanced RACH-capable cell) and, at block 415, trigger a cell reselection procedure to be performed such that UE 101 moves to another cell (e.g., cell Y). In an aspect, the trigger for a cell update can be the satisfaction of criteria that cause the move to a new cell. For example, UE 101 can perform measurements of cells and evaluate reselection criteria on the measured cells. If any of the other measured cells adequately satisfy the cell update criteria, UE 101 can trigger the cell update at block 415. In an aspect, the trigger for cell update can occur in the RRC layer of UE 101. The cell update procedure can cause UE 101 to receive new UE configuration information.

In response to a cell update that was triggered at block 415, in an aspect, UE 101 and/or MCCM 120 and/or CCIF 122 can identify a UE configuration conflict at block 417. As will be discussed below, the cell update procedure may initiate a state change that is associated with a second UE state and a second UE configuration. MCCM 120 can use CCIF 122 to identify the upcoming conflict in UE configuration and may modify the reconfiguration associated with the cell update procedure 419 to avoid the conflict.

In an aspect, UE 101 can perform a cell update procedure 419. In an aspect, the cell update procedure triggers UE 101 to transition to a second UE state having a second UE configuration. In an aspect, UE 101 can be in a CELL_FACH state to perform the cell update procedure 419. During the cell update procedure 419, RRC entity 402 generates and sends a cell update message 421 to RLC entity 403. RLC entity 403 can then generate and send a cell update message 422 to RLC entity 405. In an aspect, via operation of MCCM 120 and/or message-handling function 124, both cell update messages 421, 422 include additional information about the second UE configuration in an additional information element (IE) included in each respective message. In an aspect, the network entity can process the included IE to delete the unsent SDU segments that included the stale UE configuration information. In an aspect, the IE can be an IE am_RLC_ErrorIndicationRb2_3or4 bit that is set to "TRUE". In an aspect, the cell update message 422 can be sent to RLC entity 405 over a common control channel (CCCH).

In response to receiving cell update message 422, RLC entity 405 can process the message and send a cell update confirm message 423 back to UE 101. In an aspect, the cell update confirm message 423 can be send over a control channel, such as a dedicated control channel (DCCH). In an aspect, the cell update confirm message 423 can include an updated UE configuration information based on the information provided by UE 101 in the cell update message. In an aspect, the UE configuration information provided in the cell update message (e.g., CONFIG. 2) is different than the UE configuration information included in the sent segments (CONFIG. 1) 411, 413.

Upon receipt of cell update confirm message 423, RLC entity 403 can send an update confirm message 424 to RRC entity 402. Once RRC entity 402 receives the cell update confirm message 424, UE 101 can determine the unique message identifier (UMI) based on the contents of the cell update confirm message 424. In the illustration, for example, RRC entity 402 may retrieve the new RNTI included in cell update confirm message 424 and determine it is the new UMI. Once UE 101 determines the UMI, RRC entity 402 can generate and send a UMI confirm message 425 to RLC entity 403, which can send a UMI confirm message 426 to RLC entity 405 to complete the cell update procedure.

At block 428, RLC entity 403 and/or RLC entity 405 can optionally delete any unsent message segments that were generated using the UE configuration information associated with the first UE configuration. In an aspect, in response to the information element included in cell update message 422, RLC entity can use the UE configuration information to determine that the UE configuration information included in the segments of the SDU are stale and can delete the segments. In an aspect, RLC entity 403 can determine that unsent measurement reports that were generated with the first UE configuration are stale and can delete the segments.

After optionally deleting the remaining unsent message segments that included the stale UE configuration information, RLC entity 405 can generate and send a reconfiguration request message 431 that includes the updated UE configuration information. In an aspect, in instances when the Cell Update Confirm message 423 included configuration information that was different than the configuration included in the messages 411, 413, reconfiguration request message may include subsequently-updated configuration information after UE 101 performed an RLC reset procedure (e.g., CONFIG. 2). In such instances, UE 101 may be reconfigured using his subsequently-updated configuration information. Upon receiving the reconfiguration request message 431, RLC entity 403 can generate and send a reconfiguration message 433 to RRC entity 402.

RRC entity 402 can complete the reconfiguration procedure by sending a reconfiguration complete message 435 to RLC entity 403, which sends a reconfiguration complete message 437 to RLC entity 405 to confirm completion of the reconfiguration procedure. In an aspect, the UE 101 remains in sync with network entity 130, as the information included in the reconfiguration request message 431 includes the new UE configuration information.

Referring to diagram 400' of FIG. 4B, in an aspect, for example, when UE 101 is in state such as a CELL_FACH state or a CELL_PCH state, RLC entity 403 of UE 101 may send one or more measurement reports 412 to NW entity 130. In an aspect, the measurement report 412 may include instructions, such as instructions to add/remove a radio link and/or a cell from the active set of UE 101. For example, measurement report 412 may include an "event 1C" indication that indicates a change to the active set (e.g., adding a new cell). In such instances, UE 101 may wait to receive an acknowledgement message (e.g., L2 ACK 430) from NW entity 130.

At block 414, RLC entity 403 can determine a radio link failure. In an aspect, UE 101 may wait for a period to receive an acknowledgement from network entity 130 in relation to sending measurement report 412. When the waiting period expires (or if, for example, the channel quality is greatly degraded), UE 101 may determine that there is a radio link failure and may trigger a cell update at block 415.

At block 415, UE 101 can trigger a cell update. In an aspect, the trigger for a cell update can be the satisfaction of criteria that cause the move to a new cell. For example, UE 101 can perform measurements of cells and evaluate reselection criteria on the measured cells. If any of the other measured cells adequately satisfy the cell update criteria, UE 101 can trigger the cell update at block 415. In an aspect, the trigger for cell update can occur in the RRC layer of UE 101. The cell update procedure can cause UE 101 to receive new UE configuration information.

In response to a cell update that was triggered at block 415, in an aspect, UE 101 and/or MCCM 120 and/or CCIF 122 can identify a UE configuration conflict at block 417. As will be discussed below, the cell update procedure initiates a state change that is associated with a second UE state and a second UE configuration. MCCM 120 can use CCIF 122 to identify the upcoming conflict in UE configuration and may modify the reconfiguration associated with the cell update procedure 419 to avoid the conflict.

In an aspect, UE 101 can perform a cell update procedure 419. In an aspect, the cell update procedure triggers UE 101 to transition to a second UE state having a second UE configuration. In an aspect, UE 101 can be in a CELL_FACH state to perform the cell update procedure 419. During the cell update procedure 419, RRC entity 402 generates and sends a cell update message 421 to RLC entity 403. RLC entity 403 can then generate and send a cell update message 422 to RLC entity 405. In an aspect, via operation of MCCM 120 and/or message-handling function 124, both cell update messages 421, 422 include additional information about the second UE configuration in an additional information element (IE) included in each respective message. In an aspect, the network entity can process the included IE to delete the received measurement report(s) that included the stale UE configuration information. In an aspect, the IE can be an IE am_RLC_ErrorIndicationRb2_3or4 bit that is set to "TRUE". In an aspect, the cell update message 422 can be sent to RLC entity 405 over a common control channel (CCCH).

In response to receiving cell update message 422, RLC entity 405 can process the message and send a cell update confirm message 423 back to UE 101. In an aspect, the cell update confirm message 423 can be send over a control channel, such as a dedicated control channel (DCCH). In an aspect, the cell update confirm message 423 can include an updated UE configuration information based on the information provided by UE 101 in the cell update message.

Upon receipt of cell update confirm message 423, RLC entity 403 can send an update confirm message 424 to RRC entity 402. Once RRC entity 402 receives the cell update confirm message 524, UE 101 can determine the unique message identifier (UMI) based on the contents of the cell update confirm message 424. In the illustration, for example, RRC entity 402 may retrieve the new RNTI included in cell update confirm message 424 and determine it is the new UMI. Once UE 101 determines the UMI, RRC entity 402 can generate and send a UMI confirm message 425 to RLC entity 403, which can send a UMI confirm message 426 to RLC entity 405 to complete the cell update procedure.

At block 429, RLC entity 403 and/or RLC entity 405 can optionally delete the measurement reports stored before the cell update. In an aspect, in response to the information element included in cell update message 422, RLC entity can use the UE configuration information to determine that the information included in the received measurement report 412 is stale and can delete the segments. In an aspect, RLC entity 403 can determine that unsent measurement reports that were generated with the first UE configuration are stale and can delete the segments. In an aspect, the information element included in the cell update message 422 can include instructions for the network entity 130 to refrain from sending an acknowledgement message in response to receiving the measurement report 412.

After optionally deleting the remaining unsent message segments that included the stale UE configuration information, RLC entity 405 can generate and send a reconfiguration request message 431 that includes the updated UE configuration information. In an aspect, in instances when the Cell Update Confirm message 423 included new configuration information, reconfiguration request message 431 may include subsequently-updated configuration information after UE 101 performed an RLC reset procedure (e.g., CONFIG. 2). In such instances, UE 101 may be reconfigured using his subsequently-updated configuration information. Upon receiving the reconfiguration request message 431, RLC entity 403 can generate and send a reconfiguration message 433 to RRC entity 402.

RRC entity 402 can complete the reconfiguration procedure by sending a reconfiguration complete message 435 to RLC entity 403, which sends a reconfiguration complete message 437 to RLC entity 405 to confirm completion of the reconfiguration procedure. In an aspect, the UE 101 remains in sync with network entity 130, as the information included in the reconfiguration request message 431 includes the new UE configuration information.

Diagram 440 is similar to diagram 400. In contrast to diagram 400, MCCM 120 does not use CCIF 122 to recognize a conflict before the cell update procedure; as a result, RRC entity 402 can refrain from adding the information element regarding the updated UE configuration information. Rather, after cell update procedure 419, RLC entity 405 can send SDU segment 3 message 418, which includes the stale UE configuration information that was also included in SDU segments 411, 413. In an aspect, UE 101 may be in either a CELL_RACH or a CELL_PCH state when it receives SDU segment 3 message 418. RLC entity 403 can generate and send a reconfiguration message 430 that includes the stale UE configuration information associated with the first UE configuration.

In an aspect, at block 442, via operation of MCCM 120 and/or CCIF 122, RRC entity 402 may determine that there is a conflict in UE configurations. In an aspect, the determination may include determining that not all the SDU segments were received (this occurs, for example, if RRC entity 402 performs block 442 before receiving reconfiguration message 430). In an aspect, MCCM 120 of UE 101 may use CCIF 122 to determine that the UE configuration information included in reconfiguration message 430 conflicts with the current UE configuration information.

RRC entity 402, via operation of MCCM 120 and/or message-handling function 124, may respond to the determination at block 442 by generating and sending a reconfiguration failure message 443. RLC entity 403 may then send a reconfiguration failure message 445 to RLC entity 405. Network entity 130, in response to receiving the reconfiguration failure message 445, may determine that the SDU was not successfully received and may respond by sending a reconfiguration request message 431 that includes the updated UE configuration information. Messages 431-437 are similar to those in diagram 400.

Diagram 450 is similar to diagrams 400, and 440. Messages 411-413, 421-426, and 418-419 are similar to messages 411-415, 421-426, and 418-419 of diagram 440.

In an aspect, at block 451, via operation of MCCM 120 and/or CCIF 122, RRC entity 402 may determine that there is a conflict in UE configurations. In an aspect, the determination may include determining that not all the SDU segments were received (this occurs, for example, if RRC entity 402 performs block 442 before receiving reconfiguration message 430). In an aspect, MCCM 120 of UE 101 may use CCIF 122 to determine that the UE configuration information included in reconfiguration message 430 conflicts with the current UE configuration information.

In an aspect, via operation of MCCM 120 and/or message-handling function 124, RRC entity 402 may respond to the determination of block 451 by generating and sending a trigger RLC reset message 452. RLC entity 403 may then send a reset message 453 to RLC entity 405. Network entity 130, in response to receiving reset message 455, may respond by sending a reset acknowledgment (RESET ACK) message 455. Reset message 455 may cause the network entity to initiate a reset procedure. During the reset procedure, UE 101 may flush any SDU segments (e.g., SDU segments 611, 613) that were received before the initiation of the reset procedure. The reset procedure may also cause network entity 130 to resend a reconfiguration message. RLC entity 405 can then send reconfiguration request message 431 that includes the updated UE configuration information. Messages 431-437 are similar to those in diagram 400, 440.

Diagram 460 is similar to diagrams 400, 440, and 460. Messages 411-415, 421-426, and are similar to messages 411-415, 421-426, and of diagrams 440, 450.

In an aspect, upon the completion of the cell update procedure 617, RLC entity 403 may, at block 461, identify a conflict in UE configurations. For example, RLC entity 403 via operation of MCCM 120 and/or CCIF 122 can determine that the UE configuration information included in the SDU segments 411, 413 conflicts with the UE configuration information included in the cell update messages 421, 422.

In response to the determination at block 462, via operation of MCCM 120 and/or message-handling function 124, RLC entity at block 462 may write invalid data into the SDU segments that were received. In an aspect, for example, RLC entity 403 may write invalid data into the contents of SDU segments 411, 413. After RLC entity 403 writes invalid data into the received SDU segments, at block 463, RLC entity 403 may perform an integrity check. Due to the invalid data included in the contents of the SDU segments at block 462, the integrity check results in a failure. RLC entity 403 may then discard the SDU segments and may then generate and send a SDU failure (SDU NACK) message 465 to RLC entity 405.

The network entity, in response to receiving the SDU NACK message 665, may determine that the SDU was not successfully received and may respond by sending a new reconfiguration message. RLC entity 405 can send reconfiguration request message 431 that includes the updated UE configuration information. Messages 431-437 are similar to those in diagram 400, 440.

Figure 5A:
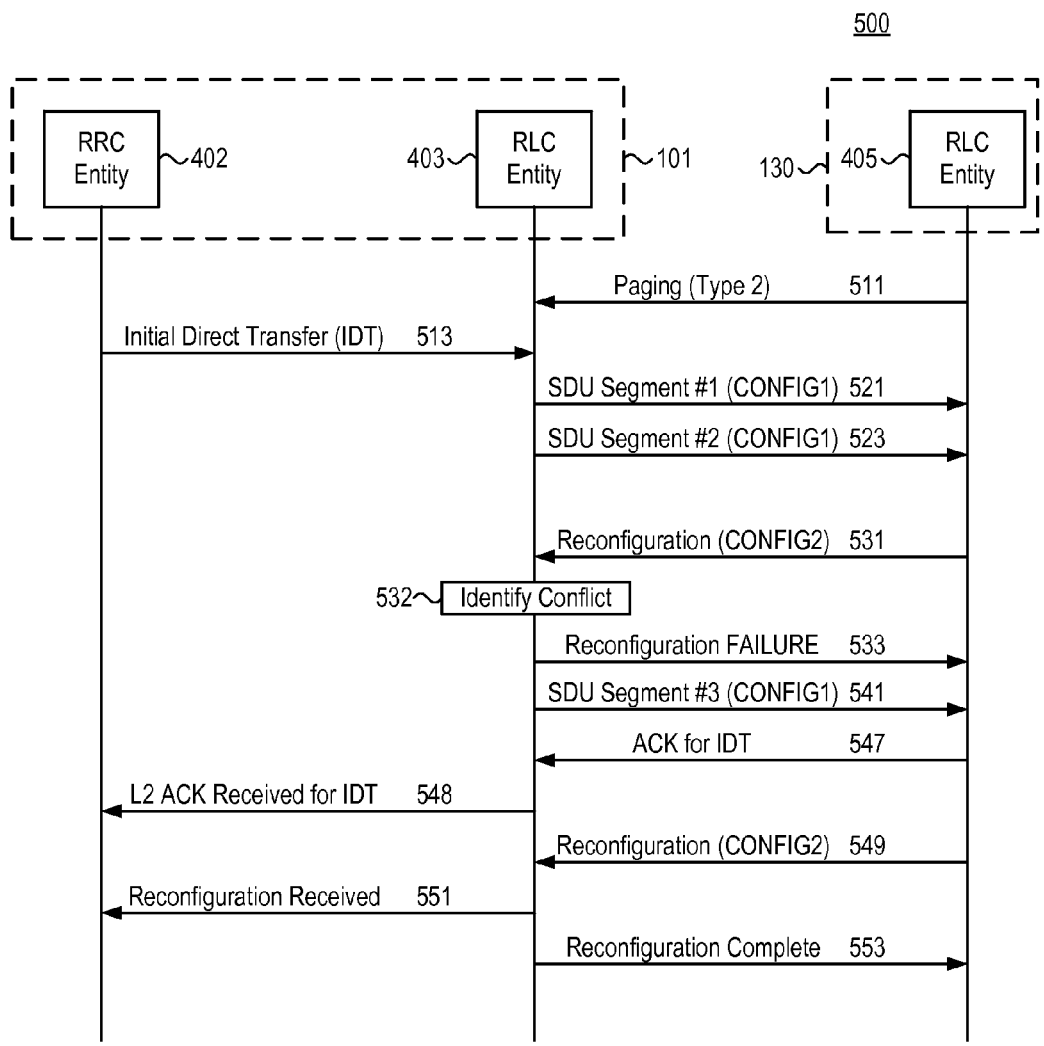
FIGS. 5A-5B are message flow diagrams of example call flows between a user equipment and a network entity with respect to aspects of the method of FIGS. 3A-3B.
Figure 5B:
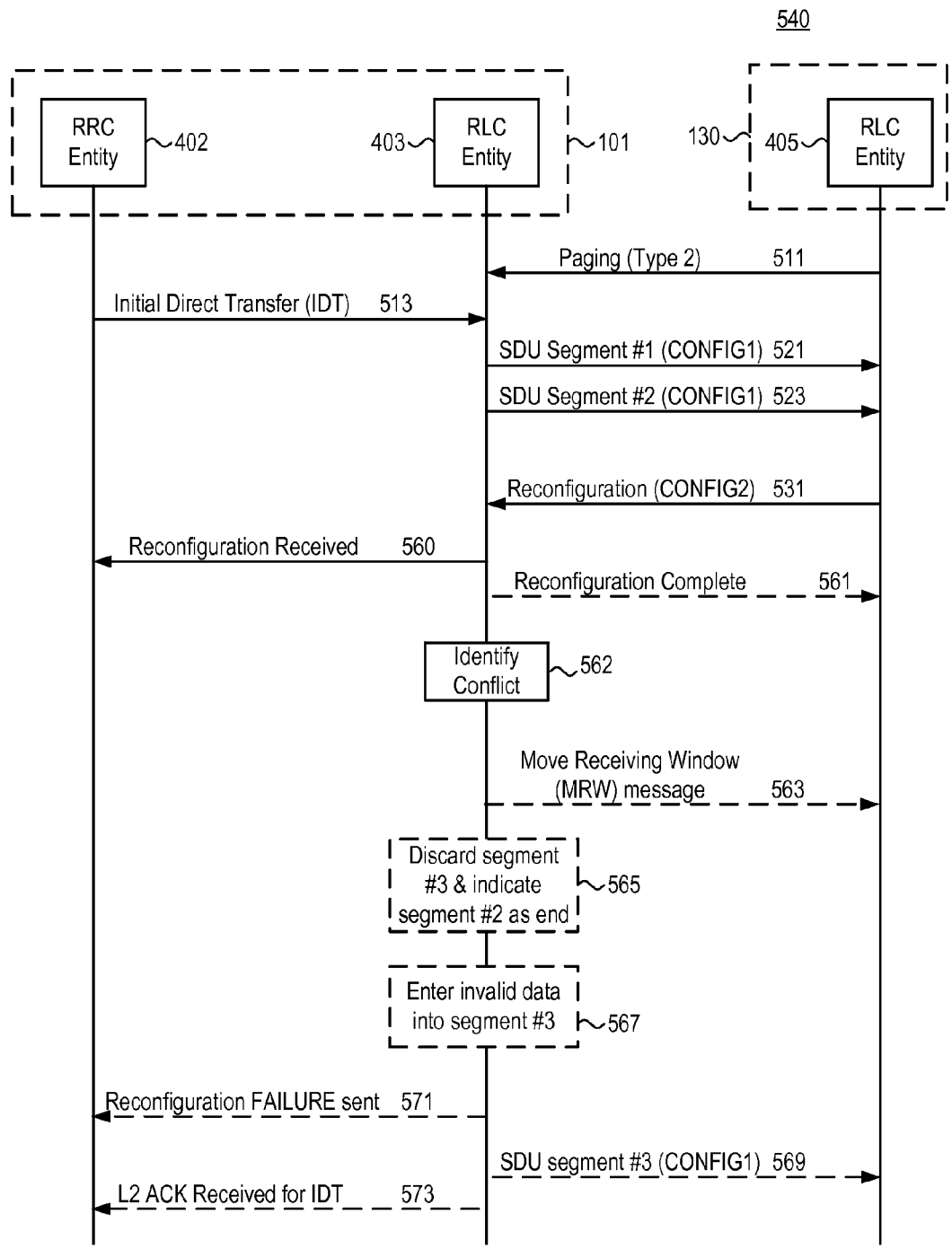

FIGS. 5A-5B are signaling diagrams describing flows of messages between devices and device components in accordance with aspects of the present disclosure relating to causing a reconfiguration failure when UE 101 has not completed transmitting a signaling message when it receives a reconfiguration request (see FIG. 3A, block 310). For example, in an aspect, diagram 500 and 540 illustrate messages sent between the Radio Resource Control (RRC) Layer Entity 402 and Radio Link Control (RLC) Layer Entity 403 in UE 101 and RLC Entity 405 in network entity 130, based on the cell reselection and/or reconfiguration of UE 101.

Diagram 500 of FIG. 5A illustrates a signaling flow that identifies a conflict in UE configuration information and prevents reconfiguration until all segments of an initial signaling message are sent by a UE. Diagram 540 of FIG. 5B illustrates a signaling flow that identifies the conflict in UE configuration information and modifies the message sent by the UE in response to the identified UE configuration conflict.

In an aspect, network entity 130 may trigger a mobile-terminated (MT) circuit-switched (CS) call. In an aspect, for example, RLC entity 405 may send a paging (type 2) message 511 to RLC entity 403 of UE 101. In an aspect, the type 2 paging message may be used by network entity 130 to page UE 101 in connected mode (e.g., when UE 101 is in CELL_DCH, CELL_FACH, or CELL_PCH mode), using the DCCH channel, for example, to inform UE 101 of an incoming call.

RRC entity 402 of UE 101 can respond by generating and sending an initial direct transfer (IDT) message 513 to RLC entity 403. In an aspect, RLC entity 403 can send service data unit (SDU) segments 1 and 2 521, 523 to RLC entity 405. In an aspect, for example, the SDU can be a signaling reconfiguration message that can have multiple segments that are sent from UE 101 to network entity 130 separately. For example, the SDU of flow diagram 500 may have three segments. In an aspect, the SDU segments 521, 523 are sent to network entity 130 using UE configuration information associated with UE 101 in a first state with a first UE configuration (CONFIG. 1).

In an aspect, network entity 130 can trigger a reconfiguration and cell update, where RLC entity 405 can send a reconfiguration message 531 to RLC entity 403. In an aspect, reconfiguration message 531 may include information to trigger UE 101 to move into a CELL_PCH state and a second UE configuration (CONFIG. 2).

In an aspect, at block 532, MCCM 120 of UE 101 may use CCIF 122 to identify a conflict between the current UE configuration (e.g., CONFIG. 1) and the attempted reconfiguration by network entity 130 (e.g., CONFIG. 2). For example, in an aspect, UE 101 may determine upon receipt of reconfiguration message 531 that all the segments for the SDU were not sent. In response to the identified conflict at block 532, UE 101 may be configured to stop the reconfiguration procedure if it did not first receive an acknowledgement for the entire SDU segment being sent. This may, for example, prevent UE 101 from changing states and may allow UE 101 to send the remaining portions of the SDU within the time allotted by the network.

In an aspect, via operation of MCCM 120 and/or message-handling function 124, RLC entity 403 may send a reconfiguration failure message 533 to RLC entity 405. In an aspect, the failure cause of the reconfiguration message may be an "incompatible receiver state" in relation to the reconfiguration message 531. In an aspect, UE 101 does not change state and sends SDU segment message 541 to RLC entity 405 while in the CELL_RACH state.

Upon receiving all the portions of the SDU segment (which were all sent by UE 101 using the first UE configuration), RLC entity 405 can send a ACK for IDT message 547 to RLC entity 403, which may trigger RLC entity 403 to generate and send an L2 ACK for IDT message 548 to RRC entity 402. This may allow UE 101 to perform a cell update procedure itself or UE 101 can subsequently perform a cell update procedure upon reception of a reconfiguration message from NW entity 130.

In an aspect, RLC entity 405 may send a subsequent reconfiguration message 549 to RLC entity 403 that contains UE configuration information associated with the second UE configuration. In an aspect, upon determining that L2 ACK for IDT message 547 was sent to RRC entity 402, RLC entity 403 may generate and send a reconfiguration received message 551 to RRC entity 402. In an aspect, RRC entity 402, upon receipt of L2 ACK received message 551 may move UE 101 into a CELL_PCH state to conduct the reconfiguration procedure. Once the reconfiguration procedure is complete, the RLC entity 403 may generate and send a reconfiguration complete message 553 to RLC entity 405.

Diagram 540 is similar to diagram 540, with messages 511-531 being similar to messages 511-531 of diagram 540. In an aspect, upon receipt of reconfiguration message 531, RLC entity 403 may generate and send a reconfiguration received message 560 to RRC entity 402. In an aspect, RLC entity 403 can optionally generate and send a reconfiguration received message 560 to RRC entity 402.

In an aspect, upon receiving the reconfiguration message 531, at block 562, MCCM 120 of UE 101 may use CCIF 122 to identify a conflict between the current UE configuration (e.g., CONFIG. 1) and the attempted reconfiguration by network entity 130 (e.g., CONFIG. 2).

When RLC entity 403 has already sent the reconfiguration complete message 561, via operation of MCCM 120 and/or message-handling function 124, RLC entity 403 can send a move receiving window (MRW) message 563 to RLC entity 405. This may move the receiving window of the network and may cause, when UE 101 abstains from retransmitting information requested by the network, network entity 130 to discard the received reconfiguration complete message 561. In an aspect, the network discarding the reconfiguration complete message may also RLC entity 403 sending the remaining portions of the SDU that include information relating to the first UE configuration.

In an aspect, when UE 101 identifies the UE configuration conflict when a response to reconfiguration message 531 was partially transmitted out of RLC entity 403, UE 101 may optionally, at block 565 and via operation of MCCM 120 and/or message-handling function 124, discard the unsent segments of the SDU. UE 101, via operation of MCCM 120 and/or message-handling function 124, may also indicate (e.g., via the length indicator (LI)) that the end of the last sent sequence (e.g., SDU segment 2 message 523) was the end of the SDU. In an aspect, UE 101, via operation of MCCM 120 and/or message-handling function 124, may optionally, at block 567, enter invalid data into the unsent segment (e.g., SDU segment 3 message 569) such that RLC entity 405 either discards or ignores the contents of SDU segment 3 message 569 when RLC entity 403 sends SDU segment 569 to RLC entity 405.

In an aspect, when UE 101 identifies the conflict in UE configuration before anything was transmitted from RLC entity 403, RLC entity 403, via operation of MCCM 120 and/or message-handling function 124, may optionally generate and send a reconfiguration failure sent message 571, such that RRC entity 402 acts as if RLC entity 403 failed to transmit a reconfiguration complete response message (e.g., reconfiguration complete message 561). In an aspect, via operation of MCCM 120 and/or message-handling function 124, RLC entity 403 may send SDU segment 3 message 569 after sending the reconfiguration failure sent message 571.

Upon successful transmission of a complete SDU segment (e.g., transmission of SDU segment 569 or indicate SDU was only the sent SDU segments at block 565), RLC entity 403 can optionally send a L2 ACK received for IDT message 573 to RRC entity 402. In an aspect, the ACK for IDT message 573 can optionally be generated before receiving an ACK for IDT message from RLC entity 405.

Several aspects of a telecommunications system have been presented with reference to an HSPA system. As those skilled in the art will readily appreciate, various aspects described throughout this disclosure may be extended to other telecommunication systems, network architectures and communication standards.

By way of example, various aspects may be extended to other UMTS systems such as W-CDMA, TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), reduced instruction-set computing (RISC) processors, advanced RISC machine (ARM) processors, systems on a chip (SOC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method of a user equipment (UE) handling messages in a wireless communication system, comprising:
    partially receiving or transmitting, by a receiver or transmitter of the UE from or to a network entity via a signaling radio bearer, a first signaling-related message associated with a first UE configuration, wherein the receiving or the transmitting includes transmitting, before a determination of a radio link failure, a measurement report message including an indication to replace a cell in an active set of the UE;

determining the radio link failure;

triggering a state transition message that initiates a change at the UE to a second UE configuration different from the first UE configuration;

sending a cell update message in response to the radio link failure, wherein the cell update message is the triggered state transition message;

discarding, upon reception, the measurement report message indicating to replace the cell in the active set, or the corresponding acknowledgement message after the sending of the indication message;

configuring the UE according to the second UE configuration;

determining, in association with the triggering of the state transition message, that the first signaling-related message has not been successfully received or successfully transmitted, wherein the determining that the first signaling-related message has not been fully received or transmitted includes determining that the measurement report message has not been received based on lack of receiving a corresponding acknowledgement message before the determining of the radio link failure;

sending, by the UE after determining that the first signaling-related message has not been successfully received or successfully transmitted, an indication message to coordinate discarding of the first signaling-related message with the network entity; and receiving, by the UE after sending the indication message, a second signaling-related message associated with the second UE configuration.

2. The method of claim 1, wherein sending the indication message comprises sending an information element (IE) having an error indication with respect to the signaling radio bearer, wherein the error indication causes a network reestablishment of the signaling radio bearer.

3. The method of claim 2, wherein sending the IE further comprises including the IE in a cell update message that is transmitted based on the state transition, wherein the cell update message comprises the state transition message.

4. The method of claim 1, further comprising:

discarding, by a recipient of the first signaling-related message associated with the first UE configuration, one or more received segments of the first signaling-related message, wherein the first signaling-related message comprises a multi-segment message, and determining that the first signaling-related message has not been successfully received comprises determining that at least one segment of the multi-segment message has not been received.

5. The method of claim 4, further comprising:

receiving a cell update confirmation message including information for the second UE configuration in response to sending the state transition message, wherein the state transition message comprises a cell update message; and receiving, after receiving the cell update confirmation message, the at least one not yet received message segment of the multi-segment message, wherein sending the indication message comprises sending a reconfiguration failure message in response to receiving the at least one message segment of the multi-segment message.

6. The method of claim 4, further comprising:

receiving a cell update configuration message including information for the second UE configuration in response to sending the state transition message, wherein the state transition message comprises a cell update message; and receiving, after receiving the cell update confirmation message, the at least one not yet received message segment of the multi-segment message, wherein sending the indication message comprises sending a reset message in response to receiving the at least one message segment of the multi-segment message.

7. The method of claim 4, further comprising:

writing, by the UE, invalid data into the received segments of the first signaling-related message in response to determining that the at least one segment of the multi-segment message has not been received, wherein sending the indication message comprises:

performing an integrity check on the received segments of the first signaling-related message, and sending a reconfiguration failure message in response to an integrity check failure for the received segments of the first signaling-related message that include the invalid data.

8. A user equipment for handling messages in wireless communication, the apparatus comprising:

at least one processor;

a receiver configured to receive messages;

a transmitter configured to send messages;

a memory; and a bus coupled to the at least one processor, receiver, transmitter, and memory, wherein the at least one processor is configured to:

partially receive or transmit, by the receiver or the transmitter of a user equipment (UE) from or to a network entity via a signaling radio bearer, a first signaling-related message associated with a first UE configuration, wherein to receive or the transmit, the at least one processor is further configured to transmit, before a determination of a radio link failure, a measurement report message including an indication to replace a cell in an active set of the UE;

determine the radio link failure;

trigger a state transition message that initiates a change at the UE to a second UE configuration different from the first UE configuration;

send a cell update message in response to the radio link failure, wherein the cell update message is the triggered state transition message;

discard, upon reception, the measurement report message indicating to replace the cell in the active set, or the corresponding acknowledgement message after the sending of the indication message;

configure the UE according to the second UE configuration;

determine, in association with the triggering of the state transition message, that the first signaling-related message has not been successfully received or successfully transmitted, wherein to determine that the first signaling-related message has not been fully received or transmitted, the at least one processor if further configured to determine that the measurement report message has not been received based on lack of receiving a corresponding acknowledgement message before the determining of the radio link failure;

send, via the transmitter after determining that the first signaling-related message has not been successfully received or successfully transmitted, an indication message to coordinate discarding of the first signaling-related message with the network entity; and receiving, via the receiver after sending the indication message, a second signaling-related message associated with the second UE configuration.

9. The user equipment of claim 8, wherein the at least one processor, when configured to send the indication message, is further configured to:

send an information element (IE) having an error indication with respect to the signaling radio bearer, wherein the error indication causes a network reestablishment of the signaling radio bearer.

10. The user equipment of claim 9, wherein the at least one processor, when configured to send the IE, is further configured to:

include the IE in a cell update message that is transmitted based on the state transition, wherein the cell update message comprises the state transition message.

11. The user equipment of claim 8, wherein the at least one processor is further configured to:

discard, by a recipient of the first signaling-related message associated with the first UE configuration, one or more received segments of the first signaling-related message, wherein the first signaling-related message comprises a multi-segment message, and wherein the at least one processor, when configured to determine that the first signaling-related message has not been successfully received, is further configured to: determine that at least one segment of the multi-segment message has not been received.

12. The user equipment of claim 11, wherein the at least one processor is further configured to:

receive a cell update confirmation message including information for the second UE configuration in response to sending the state transition message, wherein the state transition message comprises a cell update message; and receive, after receiving the cell update confirmation message, the at least not yet received one message segment of the multi-segment message, wherein the at least one processor, when configured to send the indication message, is further configured to:

send a reconfiguration failure message in response to receiving the at least one message segment of the multi-segment message.

13. The user equipment of claim 11, wherein the at least one processor is further configured to:

receive a cell update confirmation message including information for the second UE configuration in response to sending the state transition message, wherein the state transition message comprises a cell update message; and receive, after receiving the cell update confirmation message, the at least one not yet received message segment of the multi-segment message, wherein the at least one processor, when configured to send the indication message, is further configured to:

send a reset message in response to receiving the at least one message segment of the multi-segment message.

14. The user equipment of claim 11, wherein the at least one processor is further configured to:

write invalid data into the received segments of the first signaling-related message in response to determining that the at least one segment of the multi-segment message has not been received, wherein the at least one processor, when configured to send the indication message, is further configured to:

perform an integrity check on the received segments of the first signaling-related message, and send a reconfiguration failure message in response to an integrity check failure for the received segments of the first signaling-related message that include the invalid data.

15. A non-transitory computer-readable medium of a user equipment (UE) storing computer executable code for handling messages in a wireless communication system, comprising code for:

partially receiving or transmitting, by a receiver or transmitter of the UE from or to a network entity via a signaling radio bearer, a first signaling-related message associated with a first UE configuration, wherein the receiving or the transmitting includes transmitting, before a determination of a radio link failure, a measurement report message including an indication to replace a cell in an active set of the UE;

determining the radio link failure;

triggering a state transition message that initiates a change at the UE to a second UE configuration different from the first UE configuration;

sending a cell update message in response to the radio link failure, wherein the cell update message is the triggered state transition message;

discarding, upon reception, the measurement report message indicating to replace the cell in the active set, or the corresponding acknowledgement message after the sending of the indication message;

configuring the UE according to the second UE configuration;

determining, in association with the triggering of the state transition message, that the first signaling-related message has not been successfully received or successfully transmitted, wherein the determining that the first signaling-related message has not been fully received or transmitted includes determining that the measurement report message has not been received based on lack of receiving a corresponding acknowledgement message before the determining of the radio link failure;

sending, by the UE after determining that the first signaling-related message has not been successfully received or successfully transmitted, an indication message to coordinate discarding of the first signaling-related message with the network entity; and receiving, by the UE after sending the indication message, a second signaling-related message associated with the second UE configuration.

16. The non-transitory computer-readable medium of claim 15, wherein sending the indication message comprises sending an information element (IE) having an error indication with respect to the signaling radio bearer, wherein the error indication causes a network reestablishment of the signaling radio bearer, and wherein sending the IE further comprises including the IE in a cell update message that is transmitted based on the state transition, wherein the cell update message comprises the state transition message.

17. The non-transitory computer-readable medium of claim 15, further comprising code for:
   discarding, by a recipient of the first signaling-related message associated with the first UE configuration, one or more received segments of the first signaling-related message,
   wherein the first signaling-related message comprises a multi-segment message, and determining that the first signaling-related message has not been successfully received comprises determining that at least one segment of the multi-segment message has not been received.

18. The non-transitory computer-readable medium of claim 15, further comprising code for:
   receiving a cell update confirmation message including information for the second UE configuration in response to sending the state transition message, wherein the state transition message comprises a cell update message; and
   receiving, after receiving the cell update confirmation message, the at least one not yet received message segment of the multi-segment message, wherein sending the indication message comprises sending a reconfiguration failure message in response to receiving the at least one message segment of the multi-segment message.

19. The non-transitory computer-readable medium of claim 15, further comprising code for:
   receiving a cell update confirmation message including information for the second UE configuration in response to sending the state transition message, wherein the state transition message comprises a cell update message; and
   receiving, after receiving the cell update confirmation message, the at least one not yet received message segment of the multi-segment message, wherein sending the indication message comprises sending a reset message in response to receiving the at least one message segment of the multi-segment message.

20. The non-transitory computer-readable medium of claim 15, further comprising code for:
   writing, by the UE, invalid data into the received segments of the first signaling-related message in response to determining that the at least one segment of the multi-segment message has not been received,
   wherein sending the indication message comprises:
   performing an integrity check on the received segments of the first signaling-related message, and
   sending a reconfiguration failure message in response to an integrity check failure for the received segments of the first signaling-related message that include the invalid data.

21. An apparatus for handling messages in a wireless communication system, comprising:
   means for partially receiving or transmitting, from or to a network entity via a signaling radio bearer, a first signaling-related message associated with a first UE configuration, wherein the means for receiving or the transmitting includes means for transmitting, before a determination of a radio link failure, a measurement report message including an indication to replace a cell in an active set of the UE;
   means for determining the radio link failure;
   means for triggering a state transition message that initiates a change at the UE to a second UE configuration different from the first UE configuration;
   means for sending a cell update message in response to the radio link failure, wherein the cell update message is the triggered state transition message;
   means for discarding, upon reception, the measurement report message indicating to replace the cell in the active set, or the corresponding acknowledgement message after the sending of the indication message;
   means for configuring the UE according to the second UE configuration;
   means for determining, in association with the triggering of the state transition message, that the first signaling-related message has not been successfully received or successfully transmitted, wherein the means for determining that the first signaling-related message has not been fully received or transmitted includes means for determining that the measurement report message has not been received based on lack of receiving a corresponding acknowledgement message before the determining of the radio link failure;
   means for sending, by the UE after determining that the first signaling-related message has not been successfully received or successfully transmitted, an indication message to coordinate discarding of the first signaling-related message with the network entity; and
   means for receiving, by the UE after sending the indication message, a second signaling-related message associated with the second UE configuration.

22. The apparatus of claim 21, wherein the means for sending the indication message comprises sending an information element (IE) having an error indication with respect to the signaling radio bearer, wherein the error indication causes a network reestablishment of the signaling radio bearer, and
   wherein the means for sending the IE further comprises including the IE in a cell update message that is transmitted based on the state transition, wherein the cell update message comprises the state transition message.

23. The apparatus of claim 21, further comprising:
   means for discarding, by a recipient of the first signaling-related message associated with the first UE configuration, one or more received segments of the first signaling-related message,
   wherein the first signaling-related message comprises a multi-segment message, and wherein the means for determining that the first signaling-related message has not been successfully received comprises determining that at least one segment of the multi-segment message has not been received.

24. The apparatus of claim 23, further comprising:
   means for receiving a cell update confirmation message including information for the second UE configuration in response to sending the state transition message, wherein the state transition message comprises a cell update message; and
   means for receiving, after receiving the cell update confirmation message, the at least one not yet received message segment of the multi-segment message, wherein sending the indication message comprises sending a reconfiguration failure message in response to receiving the at least one message segment of the multi-segment message.

25. The apparatus of claim 23, further comprising:
   means for receiving a cell update confirmation message including information for the second UE configuration in response to sending the state transition message, wherein the state transition message comprises a cell update message; and means for receiving, after receiving the cell update confirmation message, the at least one not yet received message segment of the multi-segment message, wherein sending the indication message comprises sending a reset message in response to receiving the at least one message segment of the multi-segment message.

26. The apparatus of claim 23, further comprising:

means for writing, by the UE, invalid data into the received segments of the first signaling-related message in response to determining that the at least one segment of the multi-segment message has not been received, wherein the means for sending the indication message comprises:
- means for performing an integrity check on the received segments of the first signaling-related message, and
- means for sending a reconfiguration failure message in response to an integrity check failure for the received segments of the first signaling-related message that include the invalid data.

* * * * *